United States Patent
Bauknecht et al.

(10) Patent No.: US 7,670,248 B2
(45) Date of Patent: Mar. 2, 2010

(54) STEPPED AUTOMATIC TRANSMISSION

(75) Inventors: Gert Bauknecht, Friedrichshafen (DE); Peter Ziemer, Tettnang (DE); Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 478 days.

(21) Appl. No.: 11/659,464

(22) PCT Filed: Aug. 8, 2005

(86) PCT No.: PCT/EP2005/008589

§ 371 (c)(1),
(2), (4) Date: Jul. 24, 2007

(87) PCT Pub. No.: WO2006/015840

PCT Pub. Date: Feb. 16, 2006

(65) Prior Publication Data
US 2008/0045372 A1 Feb. 21, 2008

(30) Foreign Application Priority Data
Aug. 6, 2004 (DE) ......... 10 2004 038 294

(51) Int. Cl.
*F16H 3/62* (2006.01)
(52) U.S. Cl. .......... 475/276; 475/284
(58) Field of Classification Search ......... 475/271, 475/275, 276, 280, 282, 284, 286, 296, 311, 475/313, 317, 319, 323, 325
See application file for complete search history.

(56) References Cited
U.S. PATENT DOCUMENTS
5,106,352 A 4/1992 Lepelletier 6,139,463 A 10/2000 Kasuya et al.
6,558,287 B2 * 5/2003 Hayabuchi et al. .......... 475/271

(Continued)

FOREIGN PATENT DOCUMENTS
DE 199 49 507 4/2001

(Continued)

*Primary Examiner*—Roger L Pang
*Assistant Examiner*—Edwin A. Young
(74) *Attorney, Agent, or Firm*—Davis & Bujold, P.L.L.C.

(57) ABSTRACT

A multi-stage automatic transmission comprises a drive input shaft (AN), a drive output shaft (AB), a double planetary transfer gearset (VS), a main gearset (HS) made as a coupled planetary gearset with at least three non-coupled input elements and one output element, and six shift elements (A to F), which, when engaged in pairs, enable at least eight forward gears to be engaged. An input element of the transfer gearset (VS) is connected with the drive input shaft (AN). An output element of the transfer gearset (VS) rotates at a speed lower than the input speed of the drive input shaft (AN). An element of the transfer gearset (VS) is fixed on a transmission housing (GG). The first input element of the main gearset (HS) can be connected via a second shift element (B) to the output element of the transfer gearset (VS), can be fixed by a third shift element (C), and can be connected with the drive input shaft (AN) by a sixth shift element (F). The second input element of the main gearset (HS) can be connected via a first shift element (A) to the output element of the transfer gearset (VS). The third input element of the main gearset (HS) can be fixed by a fourth shift element (D) and can be connected by a fifth shift element (E) to the drive input shaft (AN). The output element of the main gearset (HS) is connected to the drive output shaft (AB). The third and sixth shift elements (C, F) are arranged on the side of the main gearset (HS) opposite to the transfer gearset (VS). Alternatively, the third shift element (C) can also be arranged radially over the main gearset (HS).

29 Claims, 13 Drawing Sheets

U.S. PATENT DOCUMENTS

| | | |
|---|---|---|
| 6,634,980 B1 | 10/2003 | Ziemer |
| 7,244,212 B2 * | 7/2007 | Bauknecht et al. .......... 475/284 |
| 2002/0142880 A1 | 10/2002 | Hayabuchi et al. |
| 2002/0183154 A1 | 12/2002 | Ziemer |
| 2003/0083173 A1 | 5/2003 | Miyazaki et al. |
| 2004/0072648 A1 | 4/2004 | Dreibholz et al. |
| 2004/0116238 A1 | 6/2004 | Ziemer |
| 2005/0085332 A1 | 4/2005 | Ziemer |

FOREIGN PATENT DOCUMENTS

| | | |
|---|---|---|
| DE | 101 15 987 | 10/2002 |
| DE | 102 50 373 | 7/2003 |
| DE | 102 10 348 | 10/2003 |
| DE | 102 21 095 | 7/2004 |
| DE | 103 18 565 | 11/2004 |
| EP | 0 997 663 | 5/2000 |
| EP | 1 375 962 | 1/2004 |
| EP | 1 510 728 | 3/2005 |
| JP | 2001182785 | 7/2001 |
| JP | 2001 349395 | 12/2001 |
| JP | 2002 295 609 | 10/2002 |
| JP | 2002 323 098 | 11/2002 |
| WO | WO 03/087624 | 10/2003 |
| WO | WO 03/095865 | 11/2003 |
| WO | WO 2005/026579 | 3/2005 |
| WO | WO 2005/100819 | 10/2005 |

* cited by examiner

| GEAR | ENGAGED SHIFTING ELEMENTS | | | | | |
|---|---|---|---|---|---|---|
| | A | B | C | D | E | F |
| 1 | ● | | | ● | | |
| 2 | ● | | ● | | | |
| 3 | ● | ● | | | | |
| 4 | ● | | | | | ● |
| 5 | ● | | | | ● | |
| 6 | | | | | ● | ● |
| 7 | | ● | | | ● | |
| 8 | | | ● | | ● | |
| R1 | | ● | | ● | | |
| R2 | | | | ● | | ● |

Fig. 1B
Prior Art

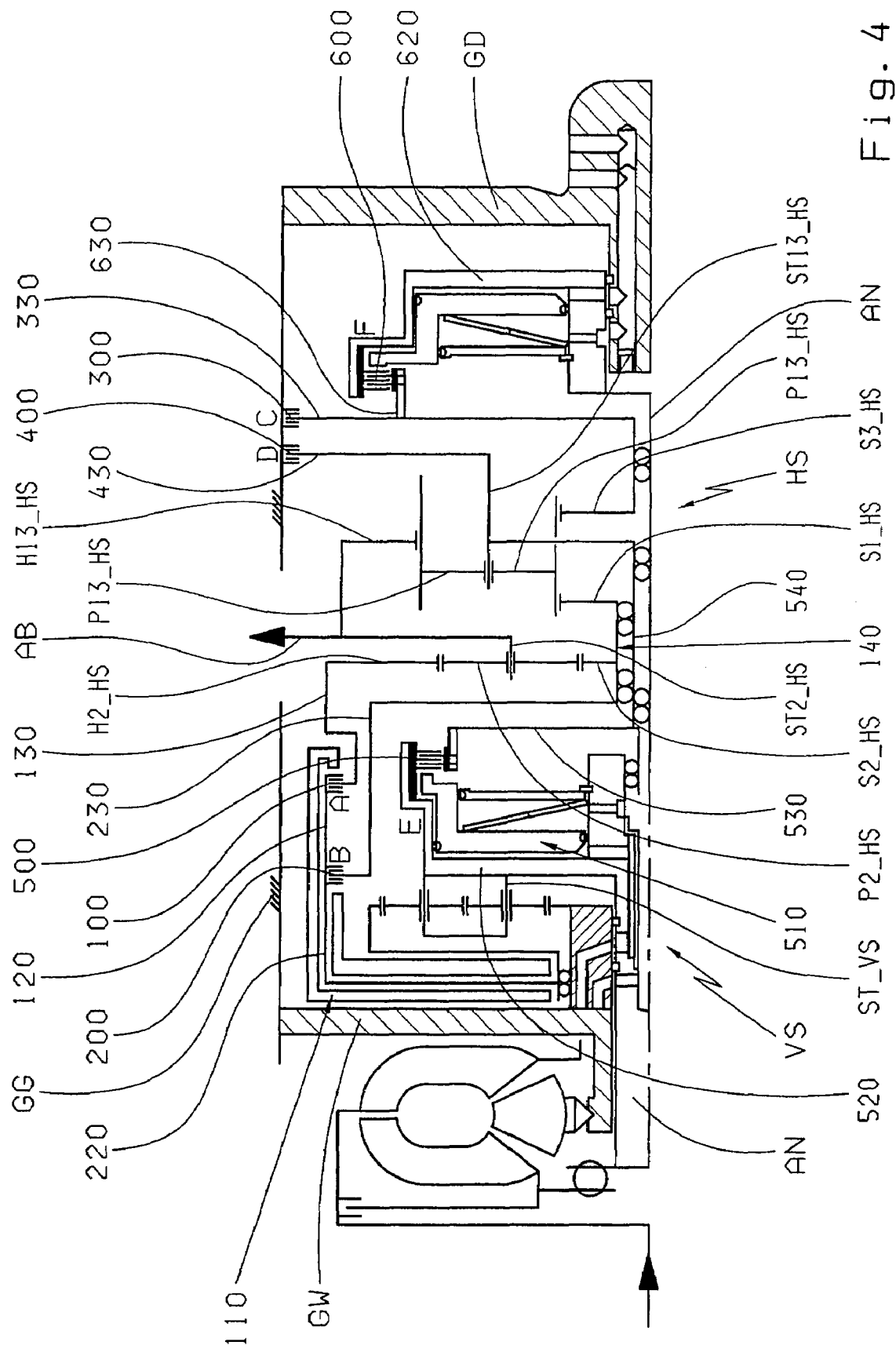

STEPPED AUTOMATIC TRANSMISSION

This application is a national stage completion of PCT/EP2005/008589 filed Aug. 8, 2005, which claims priority from German Application Serial No. 10 2004 038 294.8 filed Aug. 6, 2004.

FIELD OF THE INVENTION

The invention concerns a multi-stage automatic transmission.

BACKGROUND OF THE INVENTION

Automatic transmissions with several gears that can be engaged without range change are widely known. From U.S. Pat. No. 5,106,352 a 6-gear automatic transmission is known, in which a simple transfer planetary gearset is arranged co-axially with a two-carrier, four-shaft main gearset, made as a Ravigneaux planetary gearset, and five shift elements are provided. The transfer planetary gearset is made as a non-shiftable step-down stage with a sun gear fixed to a transmission housing, whose output speed is slower than the speed of a drive input shaft of the automatic transmission and can be transferred, via two clutches, to two different elements of the main gearset, and one of the two elements can additionally be fixed relative to the transmission housing by a first brake. The input element of the main gearset, which can optionally be connected with the output element of the transfer planetary gearset or fixed relative to the transmission housing, will be referred to in what follows as the "first input element of the main gearset". Correspondingly, the other input element of the main gearset will be called the "second input element of the main gearset" in what follows. The speed of the drive input shaft can be transferred by a third clutch to a third input element of the main gearset, and this third element can also be fixed relative to the transmission housing by a second brake. A fourth element of the main gearset forms the output element of the main gearset and is exclusively in fixed connection with a drive output shaft of the automatic transmission.

Several component arrangements different than the automatic transmission described in U.S. Pat. No. 5,106,352 are known, for example from U.S. Pat. No. 6,139,463 and DE 102 10 348 A1.

In the unpublished German patent application DE 102 21 095.0 by the present Applicant, a further development of the 6-gear automatic transmission known from U.S. Pat. No. 5,106,352, into a 7-gear automatic transmission, is described. Compared with U.S. Pat. No. 5,106,352 the transfer planetary gearset is made as a simple, shiftable 'positive' planetary gearset of double-planetary structure and an additional, sixth shift element is added. A carrier of the transfer planetary gearset forms the input element of the transfer planetary gearset in fixed connection with the drive input shaft of the automatic transmission. In contrast to U.S. Pat. No. 5,106,352 a sun gear of the transfer planetary gearset can be fixed relative to a transmission housing by the sixth shift element. Correspondingly, an ring gear of the transfer planetary gearset forms the output element of the transfer planetary gearset that can be connected with two different elements of the main gearset, and rotates at a speed slower than or equal to that of the drive input shaft. For this kinematic coupling of the individual gearset elements and shift elements, DE 102 21 095.0 discloses numerous different arrangements of the transmission components relative to one another.

JP 2001/182785 A describes a further development of the 6-gear automatic transmission, known from U.S. Pat. No. 5,106,352, into an 8-gear automatic transmission. Compared with U.S. Pat. No. 5,106,352, in this case, the transfer planetary gearset is made as a simple, non-shifting 'positive' planetary gearset of double-planetary structure and an additional, sixth shift element is added. A carrier of the transfer planetary gearset forms the input element of the transfer planetary gearset in fixed connection with the drive input shaft of the automatic transmission. A sun gear of the transfer planetary gearset is fixed relative to a transmission housing. Correspondingly, an ring gear of the transfer planetary gearset forms the output element of the transfer planetary gearset that can be connected with two different elements of the main gearset, and always rotates at a speed slower than or equal to that of the drive input shaft. Via the additional, sixth shift element compared with U.S. Pat. No. 5,106,352, the first input element of the main gearset—which can optionally be connected with the output element of the transfer planetary gearset or fixed relative to the transmission housing—can now optionally also be connected to the drive input shaft of the transmission. With regard to the spatial arrangement of the shift elements relative to one another and relative to the planetary gearsets, it is proposed in JP 2001/182785 A to arrange the two shift elements, by way of which the first and second input elements of the main gearset can be connected with the ring gear of the transfer planetary gearset, together with the additional, sixth shift element compared with U.S. Pat. No. 5,106,352, as a single structural group axially between the transfer planetary gearset and the main gearset. The (fifth) shift element already known from U.S. Pat. No. 5,106,352, by which the drive input shaft can be connected to the third input element of the main gearset, is arranged on the opposite side of the main gearset to this structural group, i.e., on the side of the main gearset facing away from the transfer planetary gearset. In addition, JP 2001/182785 A proposes to arrange the additional, sixth shift element compared with U.S. Pat. No. 5,106,352 within the structural group spatially radially over the shift element by way of which the first input element of the main gearset can be connected to the ring gear of the transfer planetary gearset.

In the unpublished German patent application DE 103 18 565.8 by the present applicant, an improved component arrangement of the 8-gear automatic transmission known from JP 2001/182785 A is described. In order to make only comparatively few design changes compared to the basic design of the 6-gear automatic transmission according to U.S. Pat. No. 5,106,352 upon which these variations are modelled, in DE 10318565.8 it is proposed to maintain the spatial position of the transfer planetary gearset, the Ravigneaux main gearset and the first five shift elements relative to one another in the transmission housing, known from the 6-gear automatic transmission, and to arrange the additional, sixth shift element compared with U.S. Pat. No. 5,106,352 in the transmission housing on the side of the transmission facing a drive engine, spatially between a transmission housing wall on the drive input side and a first shift element, by which the output element of the transfer planetary gearset can be connected with the second input element of the main gearset, but spatially also between the transmission housing wall, on the drive input side, and the transfer planetary gearset. The additional, sixth shift element compared with U.S. Pat. No. 5,106,352 is thus arranged on the side of the transfer planetary gearset facing away from the main gearset.

The purpose of the present invention is further to develop the multi-stage automatic transmission described in JP 2001/182785 A and DE 10318565.8 with eight forward gears, and to provide alternative component arrangements for the planetary gearsets and the six shift elements.

SUMMARY OF THE INVENTION

The starting point for the invention is the transmission layout described in JP 2001/182785 A or the unpublished German patent application DE 103 18 565.8 by the present Applicant, for a multi-stage automatic transmission with at least eight forward gears, comprising a drive input shaft, a drive output shaft, a transfer gearset made as a double planetary gearset, a main gearset made as a coupled planetary gearset with at least three non-coupled input elements and an output element, and at least six shift elements. By the selective engagement of two of the shift elements at a time, rotation of the drive input shaft can be transferred to the drive output shaft in such manner that to shift from one gear to the next gear up or down, only one of the shift elements actuated at the time is disengaged and one other shift element is engaged. The entire disclosure content of the unpublished German patent application DE 103 18 565.8 by the present applicant is expressly incorporated by reference as part of the disclosure content of the present invention.

An input element of the transfer planetary gearset is in permanent connection with the drive input shaft. An output element of the transfer planetary gearset always rotates at a speed slower than that of the drive input shaft. A third element of the transfer planetary gearset is fixed relative to a transmission housing. The output speed of the transfer planetary gearset can be transferred, via two shift elements, to two different input elements of the main gearset. The rotation of the drive input shaft can also be transferred to two different input elements of the main gearset by two other shift elements. The output element of the main gearset is in permanent connection with the drive output shaft.

In a preferred embodiment of this transmission layout as an 8-gear automatic transmission, a (coupled) carrier of the transfer planetary gearset forms its input element permanently connected with the drive input shaft, an ring gear of the transfer planetary gearset forms its output element that can be connected with two different input elements of the main gearset, and a sun gear of the transfer planetary gearset forms its third element fixed relative to the transmission housing. The transfer and main gearsets are arranged co-axially with one another. The main gearset can be made as a two-carrier, four-shaft transmission having the structure of a "Ravigneaux planetary gearset", with a first sun gear as the first input element of the main gearset, which can optionally be connected with the ring gear of the transfer gearset or the drive input shaft or can be fixed relative to the transmission housing, with a second sun gear as the second input element of the main gearset, which can be connected with the ring gear of the transfer gearset, with a (coupled) carrier as the third input element of the main gearset, which can optionally be connected with the drive input shaft or fixed relative to the transmission housing, and with an ring gear as the output element of the main gearset, which is permanently connected with the drive output shaft. In this case:

an input element of the first shift element is connected to the output element of the transfer gearset;
an output element of the first shift element is connected to the second input element of the main gearset;
a an input element of the second shift element is connected to the output element of the transfer gearset;
an output element of the second shift element is connected to the first input element of the main gearset;
an input element of the third shift element is connected to the transmission housing;
an output element of the third shift element is connected to the first input element of the main gearset;
an input element of the fourth shift element is connected to the transmission housing;
an output element of the fourth shift element is connected to the third input element of the main gearset;
an input element of the fifth shift element is connected to the drive input shaft;
an output element of the fifth shift element is connected to the third input element of the main gearset;
an input element of the sixth shift element is connected to the drive input shaft;
an output element of the sixth shift element is connected to the first input element of the main gearset, and
the output element of the main gearset is permanently connected to the drive output shaft.

The main gearset can, however, also be made as a two-carrier, four-shaft transmission with two coupled, one-carrier planetary gearsets, such that for example the first input element of this main gearset, which can optionally be connected to the ring gear of the transfer gearset or fixed in relation to the transmission housing, is formed by a sun gear of the first of these two one-carrier planetary gearsets of the main gearset and a carrier of the second of these two one-carrier planetary gearsets of the main gearset connected with this first sun gear of the main gearset, and such that the second input element of this main gearset, which can be connected with the ring gear of the transfer gearset, is formed by a sun gear of the second of the two one-carrier planetary gearsets of the main gearset, and such that the third input element of the main gearset, which can optionally be connected to the drive input shaft or fixed relative to the transmission housing, is formed by a carrier of the first of the two one-carrier planetary gearsets of the main gearset and an ring gear of the second of the two one-carrier planetary gearsets of the main gearset connected with this first carrier of the main gearset, and such that an ring gear of the first of the two one-carrier planetary gearsets of the main gearset is permanently connected to the drive output shaft as the output element of this main gearset. In this case the interconnection of the input and output elements of the six shift elements to the three input elements of the main gearset corresponds to the interconnection described earlier for the example of the Ravigneaux main gearset.

The main gearset can for example also be made as a "three-carrier, five-shaft transmission" with three coupled one-carrier planetary gearsets, or else as a reduced three-carrier, five-shaft transmission with three coupled one-carrier planetary gearsets, in which at least two of these individual planetary gearsets are coupled to one another ("reduced") by a common carrier and a further common central gear (i.e., either via their sun gears or via their ring gears). Analogously, the main gearset can also be made, for example, as a "reduced four-carrier, six-shaft transmission", in which the principle four individual planetary gearsets then present and coupled to one another are combined in such manner that the main gearset comprises only two carriers. In contrast to the connections of the six shift elements to the input elements of a main gearset of the "two-carrier, four-shaft planetary transmission" type, in relation to the kinematic connection of the input and output elements of the third and sixth shift elements to the individual main gearset elements there are various possibilities, in which case:

the input element of the third shift element is connected to the transmission housing;
the output element of third shift element is connected to the first input element of the main gearset or to an input element of the main gearset whose speed range is close to this first input element;

the input element of the sixth shift element is connected to the drive input shaft;

the output element of the sixth shift element is connected to the first input element of the main gearset or to an input element of the main gearset which is close to this first input element in the speed diagram.

In all the design variations mentioned, in the first forward gear, the first and fourth shift elements are engaged, in the second forward gear, the first and third shift elements, in the third forward gear, the first and second shift elements, in the fourth forward gear, the first and sixth shift elements, in the fifth forward gear, the first and fifth shift elements, in the sixth forward gear, the fifth and sixth shift elements, in the seventh forward gear, the second and fifth shift elements, and in the eighth forward gear, the third and fifth shift elements are engaged. In the reverse gear, the fourth, and in addition either the second or the sixth shift elements are engaged.

According to the invention, it is now proposed to arrange the sixth shift element by way of which the first input element of the main gearset can be connected with the drive input shaft of the transmission and which is made for example as a disk clutch, this time spatially at least mainly on the side of the main gearset opposite to the transfer gearset, and to arrange the third shift element, by way of which the input element of the main gearset can be fixed relative to the transmission housing and which is made, for example, as a disk brake or as a belt brake, at least partly on the same side of the main gearset on which the sixth shift element is also arranged, such that the transfer gearset and the main gearset are co-axial with one another. Alternatively, the third shift element can also be spatially arranged at least partly radially over the main gearset. This structural length sparing alternative transmission design is particularly suitable when the third shift element is made as a belt brake.

The sixth shift element is preferably arranged closer to one end of the transmission housing, optionally facing toward a drive engine in active connection with the drive input shaft of the transmission, or located on the side of the transmission opposite the drive engine. In an advantageous design of this arrangement, the third shift element is a disk brake with a disk set arranged closer to the main gearset and/or closer to the transfer gearset than the disk set of the sixth shift element made as a disk clutch, so that depending on the assembly situation, the disk set of the sixth shift element can be arranged axially adjacent to, or radially under the disk set of the third shift element.

From this arrangement of the third and sixth shift elements according to the invention, it results that compared with the prior art of DE 103 18 565, the multi-component main gearset arranged co-axially with the transfer gearset is positioned within the transmission housing in a mirror image relationship relative to the transfer gearset, i.e., with the second input element of the main gearset now closer to the transfer gearset than the second input element of the main gearset.

Since, viewed in the longitudinal direction of the transmission, the drive output shaft of the transmission, in active connection with the drive output element of the main gearset, is connected to a more or less axially central section of the transmission housing, axially between the transfer gearset and the third or sixth shift element, such an arrangement is particularly advantageous for a drivetrain in which the drive output is arranged axis-parallel or at an angle to the drive input, for example in a motor vehicle with "front-transverse drive" (front wheel drive with the engine arranged transversely to the longitudinal axis of the vehicle) or "front-longitudinal drive" (front wheel drive with the engine arranged along the longitudinal axis of the vehicle). The drive input shaft of the transmission passes centrally completely at least through the main gearset in the axial direction. If the drive engine of the transmission in active connection with the drive input shaft of the transmission is arranged on the transfer gearset side, opposite the main gearset, then the drive input shaft passes centrally completely through both the transfer gearset and the main gearset in the axial direction.

In a further advantageous design of the invention, a servomechanism of the sixth shift element, for actuating its disk set, is arranged close to the end of the transmission housing, or close to a housing cover at the end which is connected rotationally fixed to the transmission housing, and actuates the disk set of the sixth shift element on engagement, axially in the direction of the transfer gearset and axially in the direction of the main gearset. In an advantageous design, this servomechanism is arranged spatially inside an input element of the sixth shift element, made as a disk carrier, and always rotates at the speed of the drive input shaft of the transmission. A pressure medium supply to the pressure chamber of the servomechanism of the sixth shift element and a lubricant supply to a pressure equalization chamber provided for the dynamic pressure compensation of the rotating pressure chamber of the servomechanism of the sixth shift element, can be provided by relatively simple design means, in that the input element of the sixth shift element is mounted to rotate on a hub fixed to the transmission housing, which extends starting from the end of the transmission housing or starting from the housing cover at the end, inward into the transmission housing and axially in the direction of the main gearset, and the pressure medium and lubricant supplies pass partially within this hub. Of course, the hub and the transmission housing or housing cover can be made as one piece. To facilitate preassembly of a structural group containing all the essential elements of the sixth shift element, it is expedient for the input element of the sixth shift element, which accommodates the servomechanism of the sixth shift element, to be made as an outer disk carrier.

In a further design version of the invention, with regard to the spatial arrangement of the fourth shift element by way of which the third input element of the main gearset can be fixed relative to the transmission housing and which is made for example as a belt brake, it is proposed to arrange this fourth shift element at least partly on the side of the main gearset facing away from the transfer gearset, in particular directly adjacent to the main gearset. Thus, the fourth shift element is arranged closer to the transfer gearset than the third (and sixth) shift elements.

With regard to the spatial arrangement and actuation direction of the fifth shift element, by way of which the third input element of the main gearset can be connected with the drive input shaft of the transmission and which is made for example as a disk clutch, it is proposed to arrange this fifth shift element either on the side of the main gearset on which the sixth shift element is also arranged, or on the side of the main gearset opposite to the sixth shift element. In both cases, a servomechanism of the fifth shift element actuates a disk set associated with it on closing axially in the direction of the main gearset.

If the fifth shift element is arranged on the side of the main gearset on which the sixth shift element is also arranged, i.e., on the side of the main gearset facing away from the transfer gearset, then the fifth and sixth shift elements can expediently form a preassembled structural group comprising a common disk carrier connected to the drive input shaft of the transmission, the disk sets of these two clutches, and the servomechanisms of these two clutches. The disk set of the fifth shift element can optionally be spatially arranged radially over or radially under the disk set of the sixth shift element. Correspondingly, the disk carrier common to the fifth and sixth shift elements is made either as an inner disk carrier for the fifth shift element and, at the same time, an outer disk carrier for the sixth shift element, or as an inner disk carrier for the sixth shift element and, at the same time, an outer disk carrier for the fifth shift element. In both cases the servomechanisms of the fifth and sixth shift elements are only separated from one another by a casing surface of this common disk carrier. Preferably, the actuation directions of the two servomechanisms on engaging the clutches respectively associated with them are the same, namely axially toward the main gearset. A pressure medium supply to the pressure chambers of the two servomechanisms and a lubricant supply to the pressure equalization chambers for dynamic pressure compensation of the rotating pressure chambers of both servomechanisms, can be arranged in a comparatively simply designed manner, in that the disk carrier common to the fifth and sixth shift elements is mounted to rotate on or in the adjacent transmission housing wall, and the pressure medium and lubricant supplies pass partly within the transmission housing wall.

In contrast, if the fifth shift element is arranged on the side of the main gearset, opposite the sixth shift element, then the disk set of the fifth shift element is spatially arranged preferably in an area axially between the transfer and main gearsets. The servomechanism of the fifth shift element for actuating this disk set can also optionally be arranged in an area axially between the transfer and main gearsets, or at least mainly on the side of the transfer gearset facing away from the main gearset, and then comprises a piston acting on the disk set which overlaps the transfer gearset radially in the axial direction. Of course, in this area an actuating ram that overlaps the transfer gearset radially in the axial direction, or several actuating fingers distributed peripherally, can be provided as the active connection between the piston of the servomechanism of the fifth shift element and the disk set associated with it. If both the disk set and the servomechanism of the fifth shift element are spatially arranged axially between the transfer and main gearsets, then to achieve a compact transmission structure it is expedient for the fifth shift element to be directly adjacent to the transfer gearset and for a disk set of the first second shift and/or a disk set of the second shift element to be spatially arranged in an area radially over the fifth shift element.

BRIEF DESCRIPTION OF THE DRAWINGS

The invention will now be described, by way of example, with reference to the accompanying drawings. Comparable structural elements are indexed in the same way and show:

FIG. 1B is a shift scheme for the transmission of FIG. 1A;

FIG. 4 is an example of a third transmission layout according to the invention, with a main gearset and shift element connections modified compared with those of FIG. 2;

DETAILED DESCRIPTION OF THE INVENTION

Figure 1A:
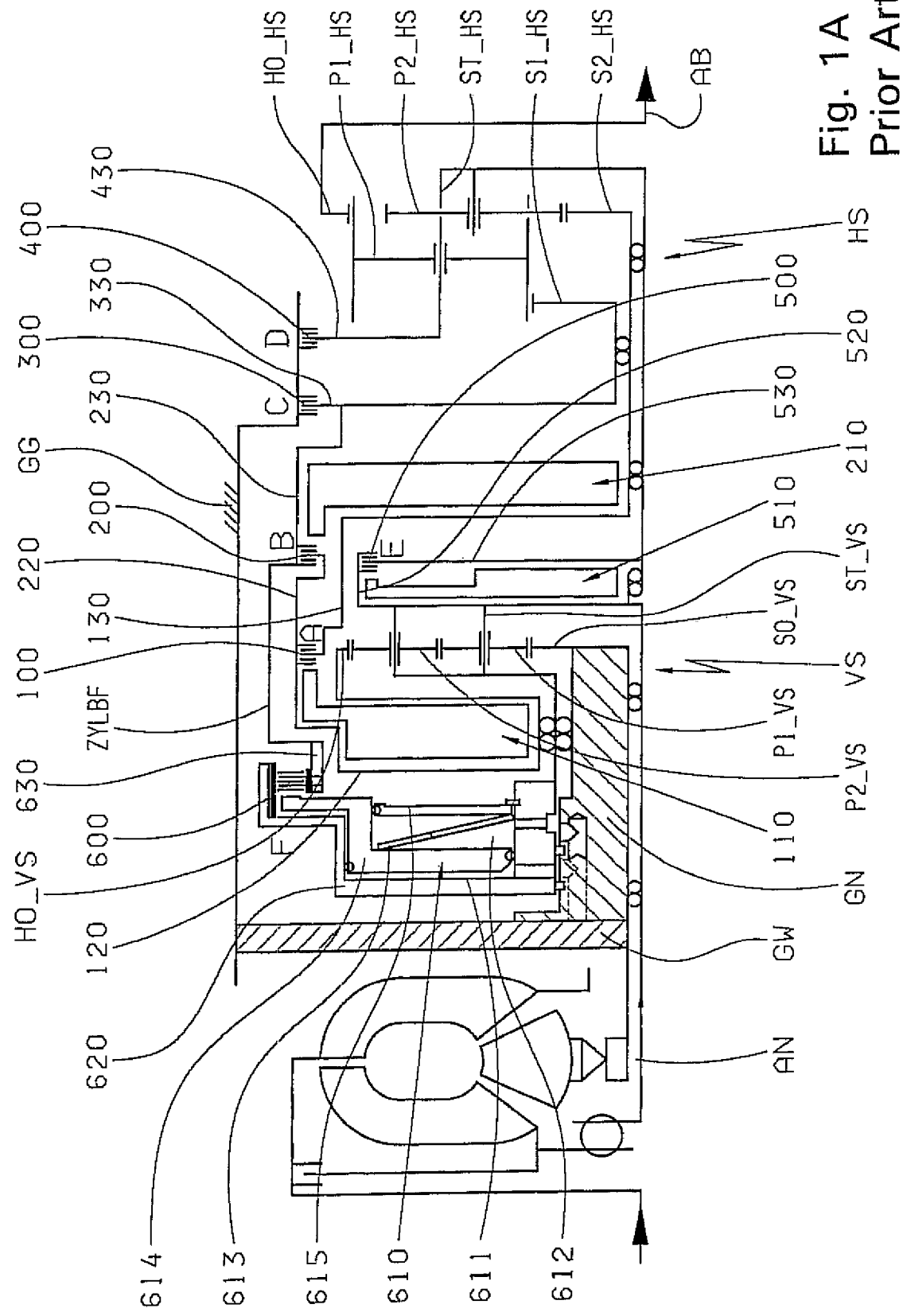
FIG. 1A is a transmission layout according to the relevant prior art.

For a better understanding, the prior art upon which the invention is based will first be explained. FIG. 1A shows the transmission layout of the relevant prior art according to DE 103 18 565.8, and FIG. 1B the corresponding shift scheme. In FIG. 1A, AN denotes a drive input shaft of the automatic transmission, which is in active connection with a drive engine (not shown) of the automatic transmission, in the example shown, via a torque converter with a torsion damper and a converter bridging clutch. AB denotes a drive output shaft of the automatic transmission arranged co-axially with the drive input shaft AN, which is in active connection with at least one drive axle of the motor vehicle. Clearly, instead of the torque converter, a frictional clutch could be arranged as the starting element for the automatic transmission between the drive engine and the automatic transmission. The drive engine could also be connected with the drive input shaft AN of the transmission, via simple torsion damper or a dual-mass flywheel or a solid shaft and, in that case, a frictional shift element would have to be formed within the automatic transmission as the starting element of the transmission.

The automatic transmission comprises a transfer gearset VS and a main gearset HS arranged co-axially with (but not directly adjacent to) this transfer gearset VS. The transfer gearset VS is made as a positive planetary gearset of double planetary structure, with an ring gear wheel HO_VS, a sun gear wheel SO_VS, and a carrier ST_VS formed of two individual carriers, on which are mounted inner planetary gears P1_VS, which mesh with the sun gear SO_VS, and outer planetary gears P2_VS, which mesh with the inner planetary gears P1_VS and the ring gear HO_VS, so that they can rotate. This transfer gearset VS, therefore, operates as a non-shifting step-down stage and produces an output speed slower than the input speed of the drive input shaft AN of the automatic transmission. For this, the sun gear SO_VS of the transfer gearset VS is fixed relative to a transmission housing GG and the carrier ST_VS is permanently connected to the drive input shaft AN. The ring gear HO_VS forms the output element of the transfer gearset VS and can be connected with individual input elements of the main gearset HS, via two shift elements A, B.

The main gearset HS is made as a coupled two-carrier, four-shaft planetary gearset with three input elements, not coupled to one another, and one output element, in the structural form of a Ravigneaux gearset with two sun gears S1_HS and S2_HS, an ring gear HO_HS and a coupled carrier ST_HS, on which long planetary gears P1_HS, which mesh with the first sun gear S1_HS and the ring gear HO_HS, and short planetary gears P2_HS, which mesh with the second sun gear S2_HS and the long planetary gears P1_HS, so as to rotate. In this, the first sun gear S1_HS forms the first input element of the main gearset HS, the second sun gear S2_HS, the second input element of the main gearset HS, the coupled carrier ST_HS, the third input element of the main gearset HS and the ring gear HO_HS, the output element of the main gearset HS.

The automatic transmission has a total of six shift elements A to F. The shift elements A, B, E and F are clutches, and the shift elements C and D are brakes. For this, the second sun gear S2_HS of the main gearset HS can be connected, via the first shift element A, with the ring gear HO_VS of the transfer gearset VS. Furthermore, the fourth sun gear S1_HS of the main gearset HS can be connected, via the second shift element B, with the ring gear HO_VS of the transfer gearset VS, via the third shift element C it can be fixed relative to the transmission housing GG, and via the sixth shift element F it can be connected with the drive input shaft AN. In addition, the carrier ST_HS of the main gearset HS can be fixed relative to the transmission housing GG, via the fourth shift element D, and can be connected with the drive input shaft AN, via the fifth shift element E. As a result of this interconnection of the individual elements of the main gearset HS to the individual shift elements, the carrier ST_HS of the main gearset HS can also be connected with the first sun gear S1_HS of the main gearset HS by simultaneous engagement of the fifth and sixth shift elements E, F. The ring gear HO_HS of the main gearset HS is permanently and exclusively connected to the drive output shaft AB.

Figure 1C:
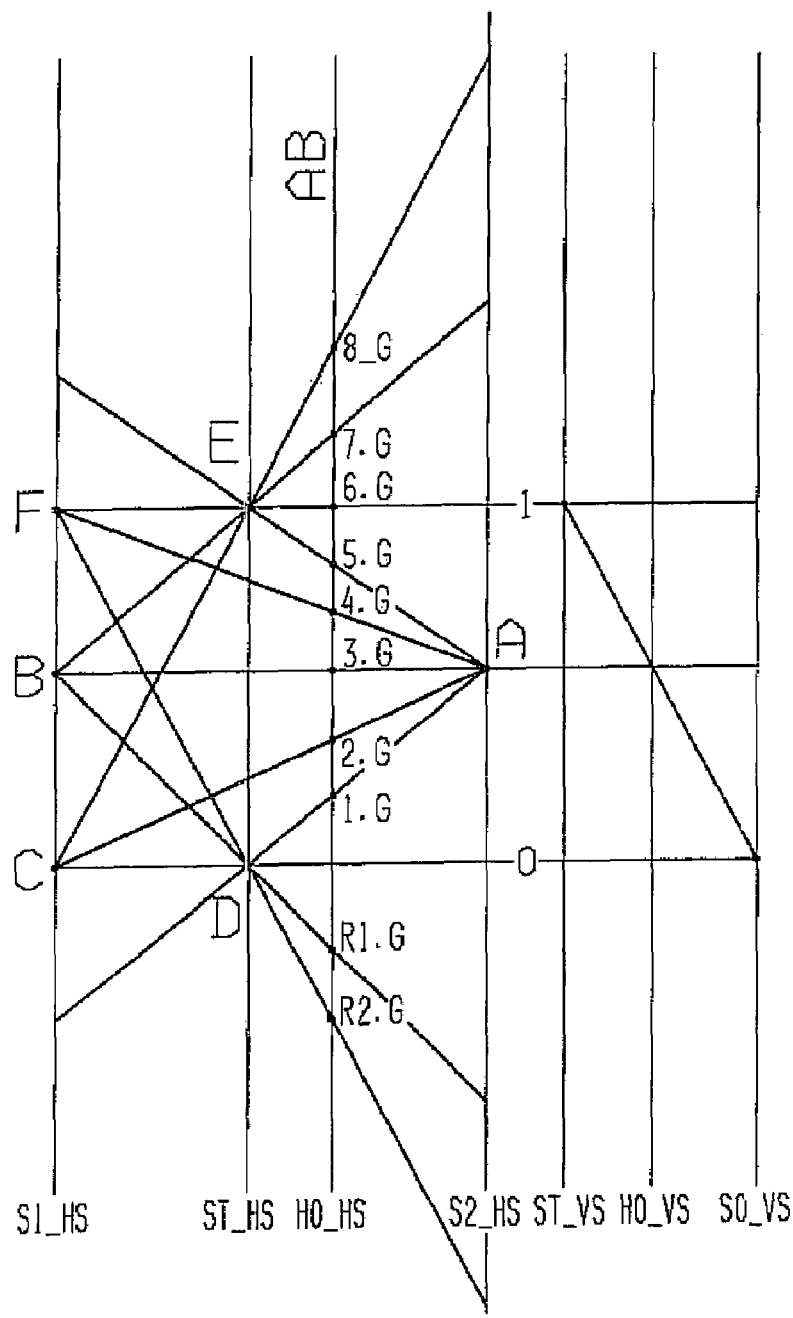
FIG. 1C is a speed diagram for the transmission of FIG. 1A.

FIG. 1B shows a shift scheme for the multi-stage automatic transmission represented in FIG. 1A. A total of eight forward gears can be engaged without range change, in such manner that to change from one gear to the next higher or lower gear, of the shift elements actuated at the time, in each case, only one shift element is disengaged and a different shift element is engaged. In first gear "1" the clutch A and the brake D are engaged, in second gear "2" the clutch A and brake C are engaged, in third gear "3" the clutches A and B, in fourth gear "4" the clutches A and F, in fifth gear "5" the clutches A and E, in sixth gear "6" the clutches E and F, in seventh gear "7" the clutches B and E, and in eighth gear "8" the brake C and the clutch E. In a first reverse gear "R1" the clutch B and the brake D are engaged. A second reverse gear "R2" can also be provided, by closing clutch F and brake D. FIG. 1C shows a speed diagram for the multi-stage automatic transmission of FIG. 1A.

Returning to FIG. 1A, the disk sets and individual input and output elements of the shift elements are indexed individually. Thus, the disk set of the first shift element A is indexed 100, the input element of the first shift element A is 120, the output element of first shift element A is 130, and a servomechanism for the actuation of the disk pack 100 of the first shift element A is 110. Correspondingly, the disk set of the other shift element B, C, D, E and F are indexed 200, 300, 400, 500 and 600, and the input elements of the other shift elements B, C, D, E and F are 220, 320, 420, 520 and 620. Also correspondingly, the output elements of the other clutches B, E and F are indexed 230, 530 and 630, and the servomechanisms of the other clutches B, E and F for actuating their respective disk sets 200, 500 and 600 are indexed 210, 510 and 610.

With regard to the spatial arrangement of the shift elements and gearsets relative to one another within the transmission housing indexed GG, DE 103 18 565.8 proposes the following: viewed axially, the fifth shift element E formed as a clutch, is arranged between the transfer gearset VS and the main gearset HS, axially directly adjacent to the transfer gearset VS. The second shift element B, also made as a clutch, is also arranged axially between the transfer gearset VS and the main gearset HS, with the disk set 200 of this clutch B spatially approximately radially over the disk set 500 of the clutch E and the servomechanism 210 of the clutch B axially adjacent the clutch E on its side facing away from the transfer gearset VS. Viewed axially in the direction of the main gearset HS, the clutch B is followed first by the third shift element C made as a brake, then by the fourth shift element D also made as a brake, and then by the main gearset HS. The disk set 100 of the first shift element A, made as a clutch, is spatially arranged approximately over the transfer gearset VS. The servomechanism 110 of this clutch A is, at least for the most part, arranged on the side of the transfer gearset VS facing away from the main gearset HS. On the side of the servomechanism 110 of the clutch A facing away from the transfer gearset VS, viewed axially between the clutch A and a housing wall GW fixed to the housing on the drive side, i.e., on the side of the clutch A and the transfer gearset VS facing away from the main gearset HS, is arranged the sixth shift element F made as a clutch.

As an example embodiment of a servomechanism of a shift element, the servomechanism 610 of the sixth shift element F is shown in more detail in FIG. 1A. This servomechanism 610 is arranged inside a cylindrical disk carrier, which forms the input element 620 of the clutch F and correspondingly rotates always at the speed of the drive input shaft AN of the transmission. The servomechanism 610 has a pressure chamber 611 formed by a casing surface section of the disk carrier of clutch F and a piston 614 of the servomechanism 610. When this pressure chamber 611 is pressurized, the piston 614 moves against the force of a restoring element 613 of the servomechanism 610, here made for example as a cup spring, axially in the direction of the transfer gearset VS so as to actuate or engage the disk set 600 of the clutch F. For the preferably complete compensation of a dynamic pressure of the rotating pressure chamber 611, the servomechanism 610 also comprises a pressure equalization chamber 612 that can be filled with unpressurized lubricant and is formed by a surface of the piston 614 and a diaphragm plate 615. The input element 620 is mounted to rotate on a hub GN fixed to the transmission housing, which extends from the fixed housing wall GW into the inside space of the transmission housing GG, axially in the direction of the transfer gearset VS as far as the sun gear SO_VS of the transfer gearset VS and is in rotationally fixed connection with this sun gear SO_VS. Correspondingly, this hub GN fixed on the transmission housing also has channels for the supply of pressure medium and lubricant to the pressure chamber and pressure equalization chamber of the clutch F.

Figure 2:
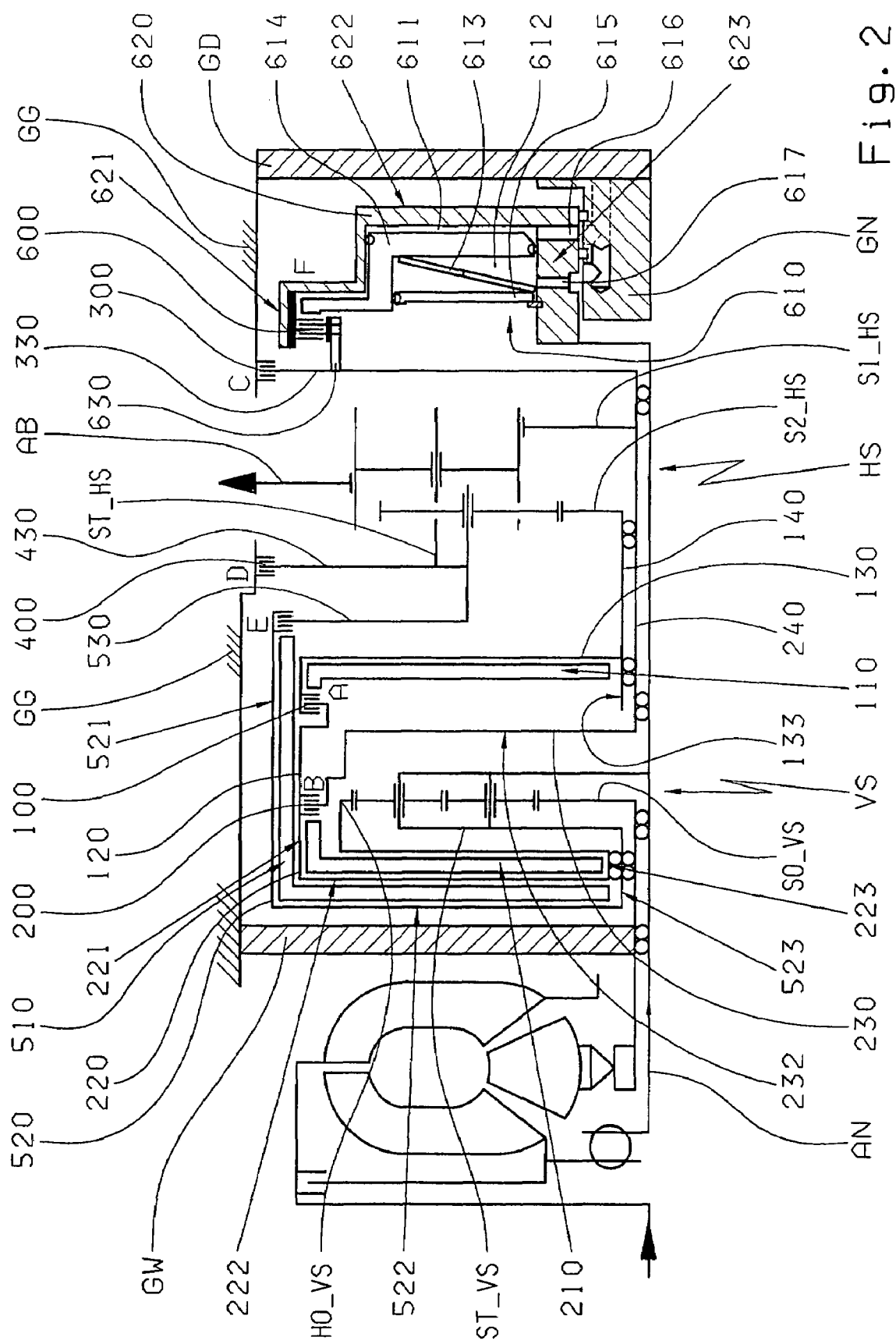
FIG. 2 is an example of a first transmission layout according to the invention, with a non-co-axial arrangement of the drive input and drive output shafts of the transmission.

Referring to FIG. 2, a first example transmission layout according to the present invention will now be explained. In contrast to FIG. 1, the drive input shaft AN and the drive output shaft AB are now not arranged co-axially with one another, so that the transmission layout shown in FIG. 2 is particularly suitable for a motor vehicle with so-termed "front-transverse drive" or "rear-transverse drive", with its drive engine mounted transversely to the longitudinal axis of the vehicle, or for a motor vehicle with so-termed "front-longitudinal drive" with an engine, at the front, mounted in the longitudinal direction of the vehicle and front-wheel drive or "rear-longitudinal drive", with a rear engine mounted in the longitudinal direction of the vehicle and rear wheel drive. The arrangement of the shift elements relative to one another and relative to the gearsets in the transmission according to the invention shown in FIG. 2 is fundamentally different from the arrangement of the shift elements of the transmission according to the relevant prior art illustrated in FIG. 1, but the coupling of gearsets and shift elements is unchanged.

The construction of the transfer gearset VS has a simple planetary gearset made as a positive planetary gearset and the main gearset HS made as a Ravigneaux gearset, and their co-axial arrangement relative to one another, are unchanged compared with the prior art. In contrast with the prior art, however, the main gearset HS is arranged in mirror image relationship relative to the transfer gearset VS, i.e., the second input element of the main gearset HS is now arranged closer to the transfer gearset VS than the first input element of the main gearset HS, i.e., the second sun gear S2_HS of the main gearset HS is now closer to the transfer gearset VS than the first sun gear S1_HS.

According to the invention, the sixth shift element F, made as a clutch, is arranged on the side of the main gearset HS opposite the transfer gearset VS. In the example shown in FIG. 2, the clutch F is adjacent a housing cover GD connected in a rotationally fixed manner on the transmission housing GG. This housing cover GD forms an end of the transmission, here for example the end of the transmission opposite a drive engine of the transmission (not shown in FIG. 2) in active connection with the drive input shaft AN. The housing cover GD is connected in a rotationally fixed manner with a housing hub GN, which extends, starting from the housing cover, inward into the transmission housing GG axially toward the main gearset HS. The input element 620 of clutch F connected to the drive input shaft AN is mounted to rotate on the housing hub GN. Correspondingly, the drive input shaft AN passes axially through the transmission as far as the clutch F—here opposite the drive engine. However, it will also be clear to a person with knowledge of the field that the drive engine of the transmission could also be arranged on the side of the transmission where the clutch F is also arranged, i.e., with the drive engine closer to the main gearset than the transfer gearset, and the drive input shaft would then pass centrally through the housing cover and the housing hub and thus through the input element of the clutch F. Of course, the housing cover and the transmission housing, or the housing hub and the housing cover, or the housing cover and the transmission housing and the housing hub, could also be made as one piece.

As can also be seen from FIG. 2, the input element 620 of the clutch F is, in this case for example, made as an outer disk carrier, in the form of a cylindrical pot open in the direction of the main gearset HS, with a hub 623 mounted to rotate on the housing hub GN fixed to the transmission housing, with an at least partly disk-shaped section 622 which extends starting from this hub 623, axially adjacent to the housing cover GD and radially outward, and with an at least partially cylindrical section 621 which extends starting from the disk-shaped section 622 axially in the direction of the main gearset HS and holds the outer disks of the disk set 600 of clutch F on its inside diameter. Correspondingly, the output element 630 of clutch F is made as an inner disk carrier, which holds the inner disks of the disk set 600 on its outer diameter and is connected both to the first input element of the main gearset HS, i.e., the first sun gear S1_HS, and also to the output element 330 of the third shift element C. Thus, the outer disk carrier, the servomechanism 610 and the disk set 600 of clutch F form a structural group that can be preassembled quite simply.

In the example embodiment shown in FIG. 2, the third shift element C is made as a disk brake. Correspondingly, the output element 330 of brake C is made as an inner disk carrier to hold the inner disks of the disk set 300 of the brake C. Correspondingly too, the input element of brake C is an outer disk carrier to hold the outer disks of the disk set 300, in this case for example integrated directly in the transmission housing GG. This disk set 300 of the brake C is arranged closer to the main gearset HS than the disk set 600 of clutch F, but in a different design it could, for example, also be spatially arranged radially over the disk set 600. For the sake of simplicity, a servomechanism for actuating the brake C is not shown in FIG. 2, but can be arranged on either side of the disk set 300 and, for example, integrated in the transmission housing. Of course, the outer disk carrier of the brake C can also be made as a separate component, which is then connected rotationally fixed to the transmission housing by suitable connection means.

Of course, the brake C could also be made as a belt brake, and then the input element of the brake C would be made as a cylinder with a brake belt working surface on its outer diameter. To reduce the axial structural length of the transmission it is appropriate to arrange this brake belt spatially, radially over the disk set 600 of clutch F. In that case, it can also be provided that the input element of clutch F is made as an inner disk carrier and the output element of clutch F, correspondingly, as an outer disk carrier, on whose outer diameter a brake belt working surface is preferably provided at the same time.

The servomechanism 610 to actuate this disk set 600 is arranged completely inside the cylindrical space formed by the outer disk carrier (input element 620) of the clutch F. This servomechanism 610 is mounted to move axially on the hub 623 of the outer disk carrier 620 of clutch F and comprises—as in the prior art—a piston 614, a pressure chamber 611, formed by a casing surface section of the outer disk carrier 620 of clutch F and the piston 614, a restoring element 613 here, for example, made as a cup spring to restore the piston 614 when the pressure chamber 611 is not pressurized, and a diaphragm plate 615, as well as a pressure equalization chamber 612 formed by the diaphragm plate and a surface of the piston 614, which can be filled with unpressurized lubricant to compensate a dynamic pressure of the rotating pressure chamber 611. When the pressure chamber 611 is pressurized, the piston 614 moves against the force of the restoring element 613 axially in the direction of the main gearset HS, and actuates or engages the disk set 600 of the clutch F.

The three shift elements A, B and E made as clutches are all arranged on the side of the main gearset HS opposite the clutch F. The other shift element D, made as a brake, is arranged at least partly on the side of the main gearset HS opposite the clutch F.

In the example embodiment shown in FIG. 2, the disk set 500 of the clutch E is spatially arranged in an area axially between the transfer gearset VS and the main gearset HS. The input element 520 of clutch E is made as an outer disk carrier, geometrically in the form of a cylindrical pot open in the direction of the main gearset HS. A hub 523 of this input element 520 is spatially arranged on the side of the transfer gearset VS facing away from the main gearset HS, mounted to rotate on a hub fixed on the transmission housing and, on its input side, permanently connected to the drive input shaft AN by way of the coupled carrier ST_VS of the transfer gearset VS that extends through the transfer gearset VS. In FIG. 2 this hub fixed on the transmission housing is, for example, a vane shaft of a torque converter connected in a rotationally fixed manner to the transmission housing GG, to which the sun gear SO_VS of the transfer gearset is also fixed. A disk-shaped section 522 of this input element 520 extends from the hub 523, adjacent to the housing wall GW here on the drive input side, radially outward as far as a diameter just under the inside diameter of the transmission housing GG. A cylindrical section 521 of the input element 520 is connected at the outer diameter of this disk-shaped section 522 and extends axially in the direction of the main gearset, thereby completely overlapping both the transfer gearset VS and the two clutches B and A in the axial direction. At its end, close to the main gearset, this cylindrical section 521 holds the outer disks of the disk set 500 of clutch E. Thus, the transfer gearset VS of the two clutches B and A are arranged completely within the cylindrical space formed by the input element 520 (in this the outer disk carrier) of the clutch E. The output element 530 of clutch E is correspondingly made as an inner disk carrier and is connected on its output side with the third input element— i.e., the coupled carrier ST_HS—of the main gearset HS.

The servomechanism 510 for actuating the disk set 500 of clutch E is also arranged within the cylindrical space formed by the input element 520 (here, the outer disk carrier) of clutch E, and mounted to move axially on the hub 523 of this input element 520. In FIG. 2 the servomechanism 510 is only shown schematically for the sake of simplicity, and is spatially arranged essentially close to the disk-shaped section 522 of the input element 520, such that an actuation finger of this servomechanism 510 overlaps the transfer gearset VS and the clutches B and A in the axial direction and actuates the disk set 500 axially toward the main gearset HS to engage the clutch E. Expediently, the servomechanism 510 also comprises dynamic pressure compensation, since it always rotates at the speed of the drive input shaft AN.

In the example embodiment shown in FIG. 2, the disk set 200 of clutch B is spatially arranged at least partly in an area radially over the transfer gearset VS. The input element 220 of clutch B is made as an outer disk carrier, geometrically in the form of a cylindrical pot open in the direction of the main gearset HS. A hub 223 of this input element 220 is spatially arranged on the side of the transfer gearset VS facing away from the main gearset HS, mounted to rotate on the hub 523 of the input element 520 of clutch E, and connected on its input side with the ring gear HO_VS of the transfer gearset VS. A disk-shaped section 222 of this input element 220 extends starting from the hub 223, adjacent to the servomechanism 510 of clutch E and radially outward as far as a diameter just under the actuating finger of the servomechanism 510. A cylindrical section 221 of the input element 220 is connected at the outer diameter of this disk-shaped section 222 and extends axially in the direction of the main gearset HS, thereby overlapping the transfer gearset VS in the axial direction. At its end close to the main gearset, the cylindrical section 221 holds the outer disks of the disk set 200 of clutch B. Thus, the transfer gearset VS is arranged inside the cylindrical space formed by the input element 220 (here the outer disk carrier) of the clutch B. The output element 230 of clutch B is correspondingly made as an inner disk carrier and is connected on its output side with the first input element—i.e., the first sun gear S1_HS—of the main gearset HS. For this, a cylindrical casing surface of the output element 230 of clutch B extends essentially along the transfer gearset VS, such that a disk-shaped section 232 of the output element 230 extends at least substantially parallel to the coupled carrier ST_VS of the transfer gearset and is connected in a rotationally fixed manner at its inside diameter to a first sun shaft 240. This first sun shaft 240 is mounted on the drive input shaft AN, extends axially in the direction of the clutch F at least as far as the first sun gear S1_HS of the main gearset HS, thus passing centrally through the second sun gear S2_HS of the main gearset HS in the axial direction, and is connected to the first sun gear S1_HS of the main gearset HS. Of course, the sun shaft 240 and the sun gear S1_HS can be made as one piece. Let it also be said at this point that the coupled carrier ST_VS of the transfer gearset VS is connected in a rotationally fixed manner on its side, facing the main gearset HS, to the drive input shaft AN.

The servomechanism 210 for actuating the disk set 200 of clutch B is also arranged inside the cylindrical space formed by the input element 220 (here the outer disk carrier) of clutch B. In FIG. 2 this servomechanism 210 is shown only schematically for the sake of simplicity. As can be seen in FIG. 2, the servomechanisms 210 and 510 of the clutches B and E are spatially arranged close to one another, separated from one another essentially only by the casing surface of the input element 220 or outer disk carrier of clutch B. The servomechanism 210 is mounted to move axially on the hub 223 of the input element 220. When the clutch B is engaged, the servomechanism 210 actuates the disk set 200 of clutch B axially in the direction of the main gearset HS. Expediently, the servomechanism 210 also comprises dynamic pressure compensation, since it always rotates at the speed of the output element of the transfer gearset VS, i.e., always at the speed of the ring gear HO_VS.

The clutch A is spatially arranged in an area axially between the transfer gearset VS and the main gearset HS. The input element 120 of clutch A is made, for example, as an ring inner disk carrier and is permanently connected to the drive input shaft AN by way of the input element 220 of clutch B. Correspondingly, the output element 130 of clutch A is made as an outer disk carrier, geometrically in the form of a pot open in the direction of the transfer gearset VS, whose hub 133 is mounted to rotate on the first sun shaft 240 and which is connected in a rotationally fixed manner at its end near the main gearset to a second sun shaft 140. This second sun shaft 140 forms the kinematic connection between the output element 130 of clutch A and the second input element—the second sun gear S2_HS—of the main gearset HS. For example, the sun shaft 240 and the sun gear S2_HS can be made as one piece. In accordance with the torques to be transferred, the disk sets 100 and 200 of clutches A and B have an at least similar diameter. In another design of the disk carrier for these two clutches A, B, a disk carrier common to the two clutches A, B can be provided, for example a common outer disk carrier.

The servomechanism 110 of clutch A, shown only schematically in FIG. 2 for the sake of simplicity, is arranged completely within the cylindrical space formed by the outer disk carrier (or output element 130) of clutch A, is mounted to move axially on the hub 133 of this outer disk carrier (or output element 130), and actuates the disk set 100 of clutch A on engagement, axially in the direction of the transfer gearset VS. This servomechanism 110 always rotates at the speed of the second input element of the main gearset HS, i.e., at the speed of the second sun gear S2_HS. It is expedient for the servomechanism of clutch A also to have dynamic pressure compensation.

The brake D is arranged directly adjacent to the main gearset HS. In the example embodiment shown in FIG. 2, the fourth shift element D is made as a disk brake, and correspondingly its output element 430 connected to the third input element of the main gearset HS. i.e., to the coupled carrier ST_HS of the main gearset HS, is made as an inner disk carrier to hold the inner disks of the disk set 400 of the brake D. Correspondingly, the input element of the brake D is an outer disk carrier to hold the outer disks of the disk set 400, which is, in this case for example, integrated directly in the transmission housing GG. For simplicity, a servomechanism for actuating the disk set 400 of brake D is not shown in FIG. 2, but can be arranged on either side of this disk set 400 and for example, integrated in the transmission housing. Of course, the outer disk carrier of brake D can also be made as a separate component, which is then connected in a rotationally fixed manner to the transmission housing by suitable connection means.

Of course, the brake D can also be made as a belt brake, and correspondingly the output element of brake D would then be made as a cylinder with a brake belt working surface on its outer diameter. To reduce the axial length of the transmission it is then appropriate to arrange this belt brake spatially radially over the disk set 500 of clutch E. In that case it can also be provided that the output element of clutch E is made as an outer disk carrier, on whose outer diameter a brake belt working surface is provided at the same time.

To those with knowledge of the subject, it will be clear that the component arrangements according to the invention shown in FIG. 2 can also be used without problems with a main gearset HS of different design. The prerequisite for this is to maintain the kinematic coupling of the output element of the main gearset HS to the drive output shaft AB, and to maintain the kinematic coupling of the at least three input elements of the main gearset HS to the six shift elements A to F (and thus also to maintain the kinematic coupling of the at least three input elements of the main gearset HS by way of these six shift elements A to F to the drive input shaft AN and the transfer gearset VS). The "new" main gearset in combination with the transfer gearset VS and the six shift elements A to F should also enable appropriate and useful gear changes. Accordingly, the structure of the main gearset HS shown in FIG. 2 as a Ravigneaux planetary gearset should be regarded as an example.

Below, referring to FIG. 3, a second example of a transmission layout according to the present invention will now be explained. Compared with the first transmission according to the invention shown in FIG. 2, in this proposed second transmission according to the invention only the design of the main gearset HS is changed. The spatial arrangement of the transfer gearset VS, the main gearset HS and the six shift elements A to F with their respective disk sets 100, 200, 300, 400, 500, 600 and their servomechanisms (in FIG. 3, for the sake of simplicity only the servomechanisms 110, 210, 510 and 610 of the four clutches A, B, E and F are shown) relative to one another within the transmission housing GG delimited at its ends by the housing wall GW and the housing cover GD, is unchanged compared with FIG. 2; accordingly, they need not be described again here.

Figure 3:
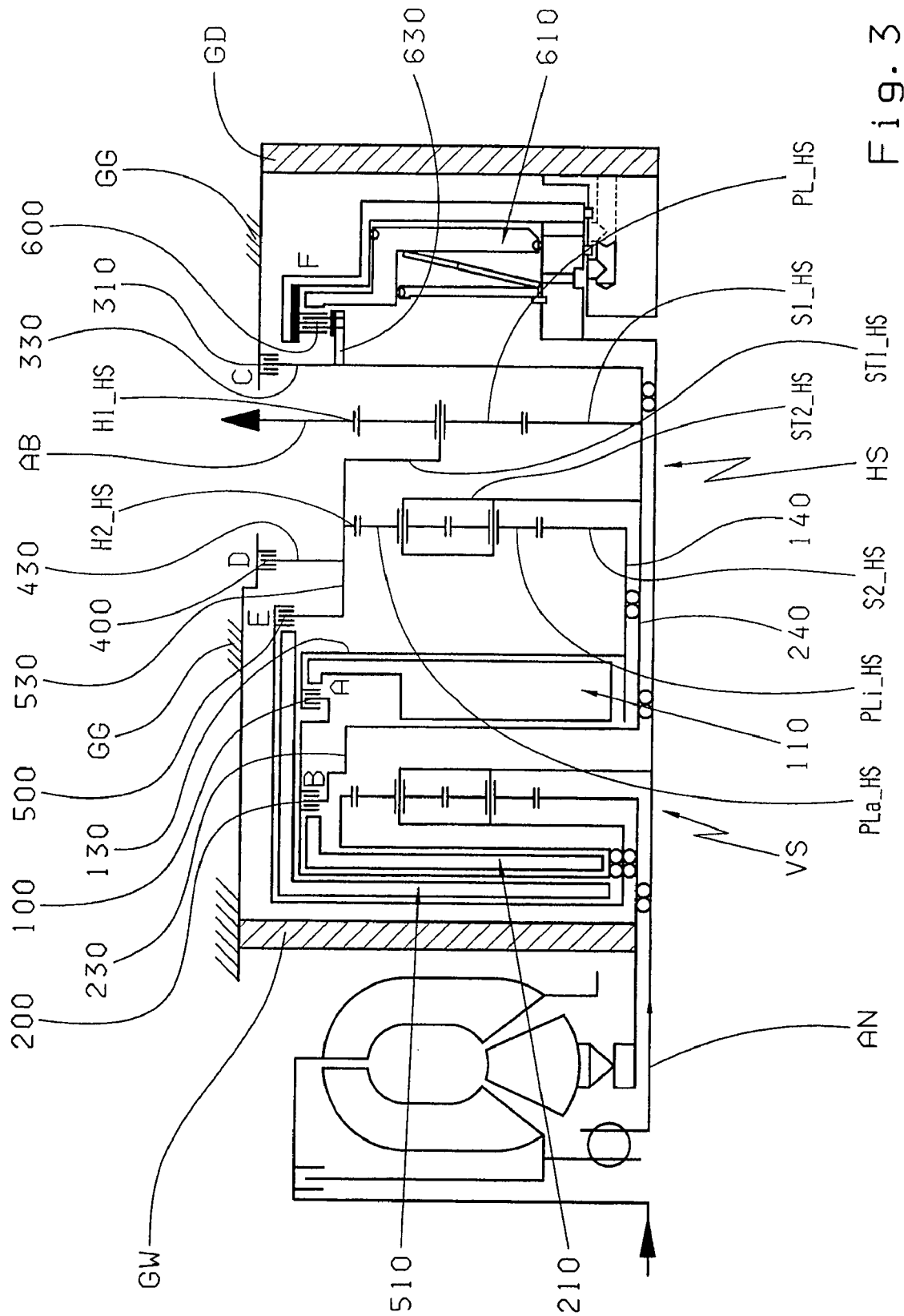
FIG. 3 is an example of a second transmission layout according to the invention, with a main gearset modified by comparison with FIG. 2.

As can be seen in FIG. 3, the main gearset HS is now made as a two-carrier, four-shaft transmission, formed by two mutually coupled individual planetary gearsets. The first individual planetary gearset of the main gearset HS is made as a "negative planetary gearset" of simple planetary design, comprising a sun gear S1_HS, an ring gear H1_HS, and a carrier ST1_HS on which planetary gears PL_HS are mounted to rotate, which mesh with the sun gear S1_HS and the ring gear H1_HS. The second individual planetary gearset of the main gearset HS is made as a "positive planetary gearset" of double planetary structure, comprising a sun gear S2_HS, an ring gear H2_HS and a coupled carrier ST2_HS on which inner planetary gears PLi_HS, and outer planetary gears PLa_HS are mounted, the inner planetary gears PLi_HS meshing with the outer planetary gears PLa_HS and the sun gear S2_HS, and the outer planetary gears PLa_HS meshing with the inner planetary gears PLi_HS and the ring gear H2_HS.

The (first) sun gear S1_HS and the coupled (second) carrier ST2_HS of the main gearset HS are permanently connected with one another and form the first input element of the main gearset HS, which is connected on the one hand, on the side of the main gearset HS facing away from the transfer gearset VS, to the output element 630 of clutch F and the output element 330 of brake C, and on the other hand, via the first sun shaft 240, to the output element 230 of clutch B. The (second) sun gear S2_HS of the main gearset HS faces toward the transfer gearset VS and forms the second input element of the main gearset HS, which is connected, via the second sun shaft 140, to the output element 130 of clutch A. The (first) carrier ST1_HS and the (second) ring gear H2_HS of the main gearset HS are permanently connected with one another and form the third input element of the main gearset HS, which is connected to the output element 530 of clutch E and the output element 430 of brake D. The (first) ring gear H1_HS of the main gearset HS forms the output element of the main gearset HS and is permanently connected to the drive output shaft AB of the transmission.

Again, with a main gearset HS of such structure in combination with the transfer gearset VS made as a positive planetary gearset of double planetary structure and the kinematic coupling, unchanged compared with FIG. 2, of the individual input and output elements of the main and transfer gearsets HS, VS trimmed the 2 Mugo pines, two yews and the rhododendron in front of the addition to the six shift elements A to F and the drive input and drive output shafts AN, AB, a total of eight forward gears can be engaged without range change, with the same logic as shown in FIG. 1B.

Below, referring to FIG. 4 a third example transmission layout according to the present invention will now be explained, which is based on the transmission layout previously described with reference to FIG. 2, again specially for a transmission with a non-co-axial arrangement of the drive input and drive output shafts AN, AB. The changes compared with the first transmission according to the invention shown in FIG. 2 concern essentially the design of the main gearset HS, the spatial arrangement of the clutch E and the brake D, and the spatial arrangement and design of the servomechanism 110 of clutch A. The spatial arrangement of the transfer gearset VS, the main gearset HS, the disk set 100 of clutch A, and the other three shift elements B, C, F (with their respective disk sets 200, 300, 600 and their servomechanisms) within the transmission housing GG delimited by the housing wall GW and the housing cover GD, are unchanged relative to one another compared with FIG. 2.

As can be seen in FIG. 4, the transfer gearset VS, made as a simple positive planetary gearset, and the multi-component main gearset HS are arranged co-axially next to one another and co-axially with the drive input shaft AN. The main gearset HS is now made as a "reduced three-carrier, five-shaft planetary transmission" with three mutually coupled individual planetary gearsets. Two of these individual planetary gearsets are combined in such a manner that they have a common ring gear and a common carrier, but separate sun gears. In principle, these two individual planetary gearsets of the main gearset so combined with one another can also be interpreted as a "planetary gearset with a divided sun gear". Correspondingly, the main gearset HS comprises three sun gears S1_HS, S2_HS and S3_HS, two ring gears H13_HS and H2_HS, and two carriers ST13_HS, ST2_HS with planetary gears P13_HS, P2_HS mounted to rotate on them.

In correspondence with the previous nomenclature, in which the output element 130 of clutch A is connected with an element of the second planetary gearset of the main gearset HS and the output element 230 of clutch B is connected with an element of the first planetary gearset of the main gearset HS, the second individual planetary gearset—comprising the ring gear H2_HS, the sun gear S2_HS and the carrier ST2_HS with short planetary gears P2_HS mounted to rotate on it—is arranged close to the transfer gearset. Correspondingly, the "planetary gearset with the divided sun gear" formed from the first and third individual planetary gearsets of the main gearset is arranged remotely from the transfer gearset and comprises the sun gears S1_HS and S3_HS, the coupled ring gear H13_HS, and the coupled carrier ST13_HS with long planetary gears P13_HS mounted to rotate on it. The long planetary gears P13_HS mesh with the ring gear H13_HS and the two sun gears S1_HS and S3_HS, and the short planetary gears P2_HS mesh with the ring gear H2_HS and the sun gear S2_HS. As a further coupling, the main gearset HS has a permanent connection between the coupled ring gear H13_HS and the second carrier ST2_HS, and a permanent connection between the first and second sun gears S1_HS, S2_HS. The long planetary gears P13_HS of the main gearset form an active connection between the first and third sun gears S1_HS, S3_HS. Thus, the first sun gear S1_HS of the main gearset HS is spatially arranged axially between the second and third sun gears S2_HS, S3_HS of the main gearset HS.

The three sun gears S1_HS, S2_HS, S3_HS, in active connection with one another, form the first input element of the main gearset HS connected to the output elements 230, 630 of clutches B, F and the output element 330 of brake C. The second ring gear H2_HS forms the second input element of the main gearset HS connected with the output element 130 of clutch A, the coupled carrier ST13_HS forms the third input element of the main gearset HS connected with the output element 430 of brake D and the output element 530 of clutch E, and the coupled ring gear H13_HS, permanently connected to the carrier ST2_HS, forms the output element of the main gearset HS, which is connected to the drive output shaft AB. In accordance with the described design of the kinematic coupling of the three sun gears S1_HS, S2_HS and S3_HS of the main gearset HS and the spatial position of the brake C and the clutch F on the side of the main gearset HS facing away from the transfer gearset VS, the output element 330 of brake C and the output element 630 of clutch F are connected in a rotationally fixed manner with the third sun gear S3_HS. The output element 230 of clutch B also connected to the first input element of the main gearset HS is connected to the second sun gear S2_HS of the main gearset HS on the side of the main gearset HS close to the transfer gearset. In the example shown, a short axial sun shaft 140 is provided for this, which also forms the rotationally fixed connection between the second sun gear S2_HS and the (spatially central) first sun gear S1_HS of the main gearset HS.

In principle the "reduced three-carrier, five-planetary transmission" shown in FIG. 4 can also be interpreted to the effect that a total of four input elements not in fixed connection with one another and one output element are provided. Corresponding to this nomenclature, the mutually connected sun gears S1_HS and S2_HS would form the first input element of the main gearset HS, the second ring gear H2_HS its second input element, the coupled carrier ST13_HS its third input element, the third sun gear S3_HS its fourth input element, and the ring gear H13_HS connected permanently with the second carrier ST2_HS the output element of the main gearset, the first and fourth input elements being in active connection with one another, via the long planetary gears P13_HS of the main gearset HS. In a speed diagram of the automatic transmission according to the invention shown in FIG. 4, the fourth input element and the first input element of the main gearset HS coincide, since the long planetary gears P13_HS of the main gearset HS are not formed as stepped planetaries and the first and third sun gears S1_HS, S3_HS of the main gearset HS have the same number of teeth.

The clutch E is spatially arranged between the transfer gearset VS and the main gearset HS, now axially directly adjacent to the transfer gearset VS. The input element 520 of clutch E connected with the drive input shaft AN is designed as an outer disk carrier, geometrically in the form of a cylindrical pot open in the direction of the main gearset HS. A hub of this outer disk carrier 520 and the drive input shaft AN are, in this case for example, made as one piece. A disk-shaped pot bottom of this outer disk carrier 520 is connected to the carrier ST_VS of the transfer gearset VS. At the inside diameter of the cylindrical casing surface of this outer disk carrier 520 a carrier profile is provided to hold the outer disks of the disk set 500 of clutch E, which are preferably made as externally toothed steel disks. The servomechanism 510 for actuating this disk set 500 is arranged inside a cylindrical space formed by the outer disk carrier 520 of clutch E, mounted to move axially on this outer disk carrier 520, always rotating at the speed of the drive input shaft AN, and actuating the disk set 500 associated with it on closing the clutch E, axially in the direction of the main gearset HS.

Correspondingly, the output element 530 of clutch E is made as an inner disk carrier which, viewed in the direction of the main gearset HS, is axially adjacent to the servomechanism 510 of clutch E and is connected in a rotationally fixed manner in its hub area with a carrier shaft 540 that extends in the direction of the main gearset HS. The design of the main gearset HS described earlier, with an individual planetary gearset and a "planetary gearset with a divided sun gear", enables elegantly designed kinematic coupling of the output element 530 of clutch E to the third input element of the main gearset HS. For this, the coupled carrier ST13_HS of the main gearset HS comprises a carrier plate, which extends radially inward and axially between the (spatially central) first sun gear S1_HS and the (spatially remote from the transfer gearset) third sun gear S3_HS of the main gearset HS. In its hub area this carrier plate is connected in a rotationally fixed manner to the carrier shaft 540. Thus, the carrier shaft 540 extends radially within the sun shaft 140, axially in the direction of the transfer gearset VS, thereby passing centrally through the first and second sun gears S1_HS, S2_HS and the hub of the output element 230 of clutch B, and is—as already mentioned—connected at its end close to the transfer gearset to a hub of the output element 530 of clutch E. Radially within the carrier shaft 540 runs the drive input shaft AN which extends as far as the clutch F, the latter being arranged—as in FIG. 2—on the side of the main gearset HS facing away from the transfer gearset.

The output element 430 of brake D also connected to the third input element of the main gearset HS is directly connected to the coupled carrier ST13_HS of the main gearset HS. Correspondingly, the disk set 400 of brake D, here again for example made as a disk brake, is arranged axially adjacent to the main gearset HS, spatially between the main gearset HS and the disk set 300 of the brake C, the latter in this case also for example made as a disk brake. Of course, the disk set 400 could also be spatially arranged at least partly in an area radially over the coupled ring gear H13_HS of the main gearset HS. Of course, the servomechanisms of the two disk brakes C, D, not shown in FIG. 4 for the sake of simplicity, provided to actuate the disk sets 300 and 400 respectively associated with them, could be spatially arranged to the left or right of their respective disk sets 300 or 400. Of course, the two brakes C, D can optionally also be made as belt brakes.

As can also be seen in FIG. 4, the design and spatial position of the clutch B with its disk set 200 and its servomechanism 210 relative to the transfer gearset VS, are in principle unchanged compared with FIG. 2. Only the disk set 200 is displaced somewhat further toward the main gearset HS. As before, the disk set 100 of clutch A is also axially adjacent to the disk set 200 of clutch B, axially in the direction of the main gearset HS. As before, these disk sets 100 and 200 also have an at least similar diameter. The clutch E is now spatially arranged radially under the disk sets 200, 100 of the clutches B, A. As before, the input element 120 of clutch A is again connected, via the input element 220 of clutch B, to the output element—i.e., the ring gear HO_VS—of the transfer gearset VS. In contrast to FIG. 2, however, this input element 120 of clutch A is now made as an outer disk carrier to hold outerdisks of the disk set 100 of clutch A preferably made as externally toothed steel disks. Correspondingly, the output element 130 of clutch A is now made as an inner disk carrier to hold the inner disks of the disk set 100 of clutch A preferably made as internally toothed lining disks. In contrast to FIG. 2, the servomechanism 110 of clutch A now always rotates at the speed of the output element—i.e., at the speed of the ring gear HO_VS—of the transfer gearset VS, and now actuates the disk set 100 associated with it on closing "in tension" in the direction opposite to the main gearset HS. For this, the servomechanism 110 is mounted to move axially on the input element 220 of clutch B, with a pressure chamber of this servomechanism 110 not shown in FIG. 4 for the sake of simplicity arranged on the side of the input element 220 of clutch B facing away from the transfer gearset VS, preferably with several peripherally distributed actuating fingers of this servomechanism 110 radially overlapping both the clutch B and the disk set 100 of clutch A in the axial direction and acting upon the disk set 100 from its side near the main gearset. Preferably, the pressure chambers of the servomechanisms 110, 210 of the two clutches A, B are arranged close to one another and only separated from one another by a casing surface of the input element (outer disk carrier) 220 of clutch B.

With regard to the design and spatial arrangement of the other structural elements of the transmission shown in FIG. 4, reference should be made to the detailed description of FIG. 2.

Figure 5A:
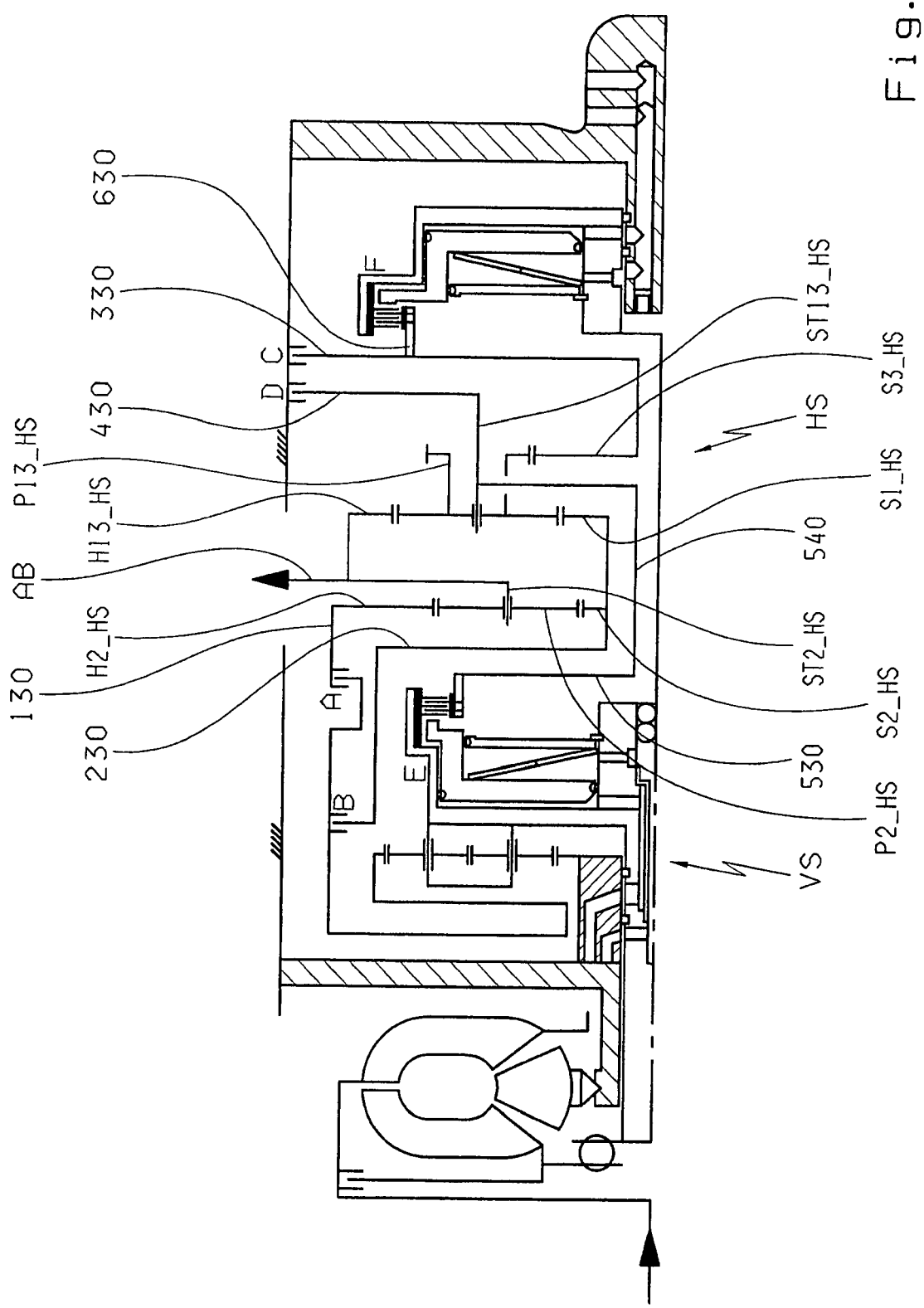
FIG. 5A is an example of a fourth transmission layout according to the invention, with a modified design of the main gearset and shift element arrangement compared with FIG. 4.

Referring to FIG. 5A, a fourth example transmission layout according to the present invention will now be explained below, which is based on the transmission layout described earlier with reference to FIG. 4, differing therefrom only in the design of the main gearset HS. With reference to this example, it should again be made clear that the component arrangement proposed in accordance with the invention can also be used with other designs of the main gearset HS having "reduced coupled planetary gearsets". The essential feature in this is only to maintain the kinematic couplings of the six shift elements A to F to the gearset elements in the sense of a sequence in the speed diagram of the automatic transmission.

As can be seen in FIG. 5A, as in FIG. 4 the main gearset HS is made as a "reduced three-carrier, five-shaft planetary transmission" with three coupled planetary gearsets, two of which are combined in such manner that they have a common ring gear and a common carrier, but separate sun gears. As in FIG. 4, the remaining individual planetary gearset of this main gearset HS comprises an ring gear H2_HS, a sun gear S2_HS and a carrier ST2_HS with short planetary gears P2_HS mounted to rotate on it. The planetary gearset combined into a "planetary gearset with a divided sun gear" of the main gearset HS, as in FIG. 4, comprises a coupled ring gear H13_HS, two sun gears S1_HS and S3_HS and a coupled carrier ST13_HS with long planetary gears P13_HS mounted to rotate on it. Overall, therefore, the main gearset HS reduced in this way actually comprises only two carriers ST13_HS, ST2_HS. The long planetary gears P13_HS mesh with the ring gear H13_HS and the two sun gears S1_HS and S3_HS, and the short planetary gears P2_HS mesh with the ring gear H2_HS and the sun gear S2_HS. As a further coupling the main gearset HS has a permanent connection between the coupled ring gear H13_HS and the second carrier ST2_HS, and a permanent connection between the first and second sun gears S1_HS, S2_HS. The long planetary gears P13_HS of the main gearset HS form an active connection between the first and third sun gears S1_HS, S3_HS. The first sun gear S1_HS of the main gearset HS is spatially arranged axially between the second and third sun gears S2_HS, S3_HS, of the main gearset.

Thus, the automatic transmission shown in FIG. 5A has a total of four input elements, not connected with one another, and one output element, in which the sun gears S1_HS and S2_HS connected with one another form the first input element connected with the output element 230 of clutch B, the second ring gear H2_HS forms the second input element connected with the output element 130 of clutch A, the coupled carrier ST13_HS forms the third input element connected with the output elements 530, 430 of the shift elements E, D, the third sun gear S3_HS forms the fourth input element connected with the output elements 630, 330 of the shift elements F, C, and the coupled ring gear H13_HS connected to the second carrier ST2_HS forms the output element of the main gearset HS connected to the drive output shaft AB. The first input element of the main gearset HS is in active connection with the fourth input element of the main gearset HS, via the long planetary gears P13_HS of the main gearset HS.

In contrast to FIG. 4, the long planetary gears P13_HS of the main gearset HS mounted to rotate on the coupled carrier ST13_HS are now made as stepped planetaries with different numbers of teeth for the two sun gears S1_HS and S3_HS of the main gearset HS. Correspondingly, the first and third sun gears S1_HS, S3_HS of the main gearset HS now have different numbers of teeth. For example, the coupled ring gear H13_HS of the main gearset HS meshes with the equal number of teeth of the long planetary gears P13_HS of the main gearset HS, with which the first sun gear S1_HS of the main gearset HS also meshes. Of course, in a different design it could also be provided that the coupled ring gear H13_HS of the main gearset meshes with the equal number of teeth of the long planetary gears P13_HS of the main gearset, with which the third sun gear S3_HS of the main gearset also meshes. The essential feature is that in a speed diagram of this automatic transmission according to FIG. 5A, the fourth input element and the first input element of the main gearset now no longer coincide, but lie close to one another in the speed diagram.

Figure 5B:
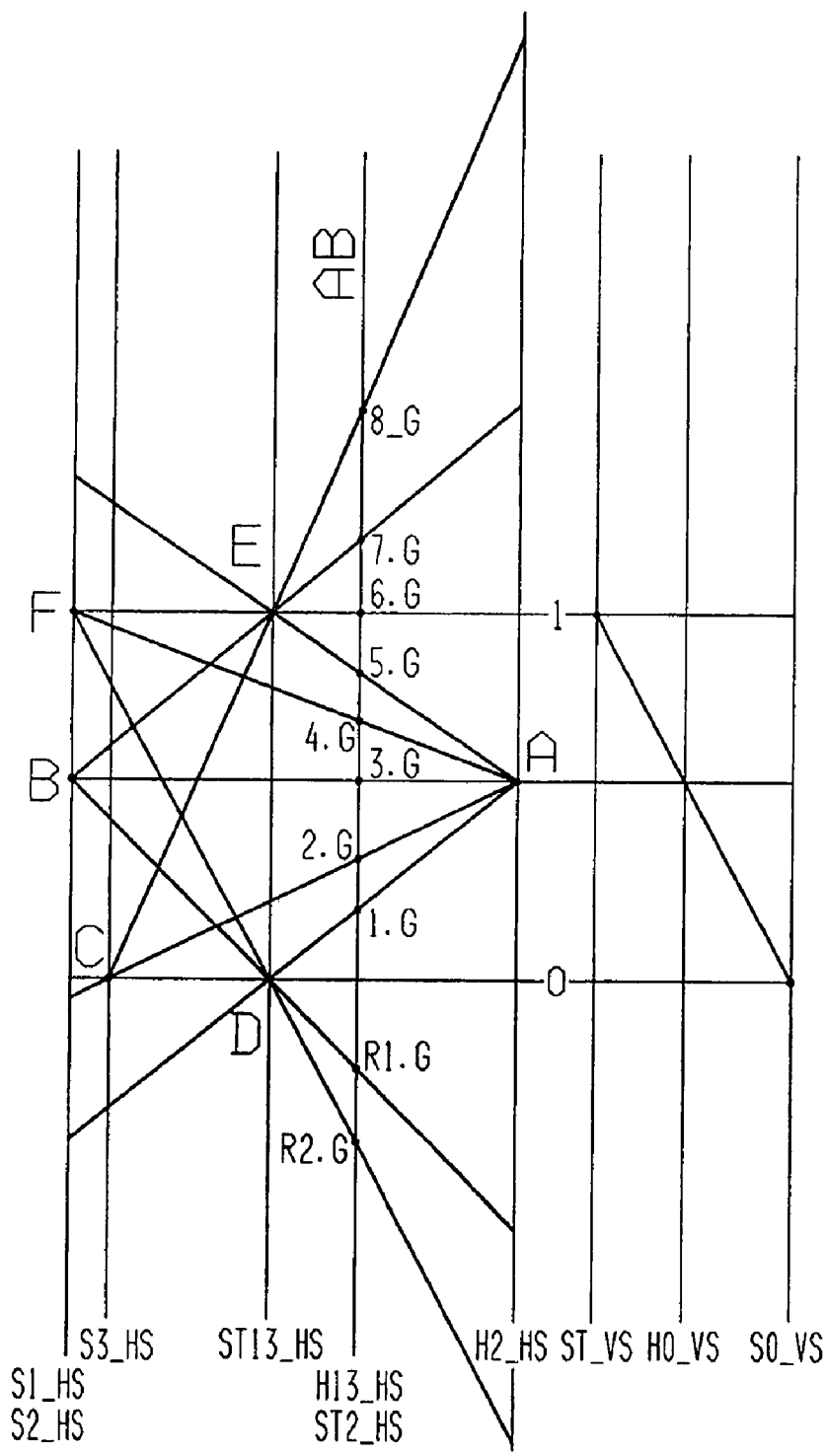
FIG. 5B is a speed diagram for the transmission shown in FIG. 5A.

To clarify this situation, FIG. 5B shows a speed diagram for the automatic transmission illustrated in FIG. 5A. For example, if the fixed transmission ratio of the first of the three coupled planetary gearsets of the main gearset HS, defined by the ratio between the numbers of teeth on the ring gear H13_HS and the sun gear S1_HS, is larger than the fixed transmission ratio of the third of the three coupled planetary gearsets of the main gearset HS, defined by the ratio between the numbers of teeth on the ring gear H13_HS and the sun gear S3_HS and by the ratio between the numbers of teeth on the two steps of the stepped planetary gears P13_HS, then the line of the fourth input element S3_HS of the main gearset HS in the speed diagram will be close to the line of the first input element S1_HS and S2_HS of the main gearset to the right thereof, i.e., closer to the line of the drive output element H13_HS and ST2_HS of the main gearset than the line of the first input element S1_HS and S2_HS of the main gearset HS. Thus, in the speed diagram the three shift elements B, C and F also no longer have a common line, and only the two clutches B and F still lie on a common line. Accordingly, the main gearset shown in FIG. 4 can also be interpreted as a special case of the main gearset according to FIG. 5A, in which—in contrast to FIG. 5A and FIG. 5B—the lines of the first and fourth input elements S1_HS, S2_HS and S3_HS— of the main gearset HS coincide.

From this it will be clear to a person with knowledge of the subject that it would also be possible, without problem, to divide all the central gears (sun gears, ring gears) of the multi-component main gearset HS as in the examples shown in FIGS. 4 and 5A, into two or more components while maintaining the number of main gearset carriers at two, so that these divided central gears are in each case kinematically in active connection with one another, via the planetary gears associated with them. Of course, the planetary gears corresponding to this divided central gear can be made as unstepped or stepped planetary gears. An example of such a further division of central gears of the main gearset is clarified in a further speed diagram shown in FIG. 5C, in which— starting from the automatic transmission according to FIG. 5A—in the main gearset the original third sun gear is again divided into sun gears S3_HS and S4_HS, so that in total there are now provided four sun gears S1_HS, S2_HS, S3_HS and S4_HS, a coupled ring gear H134_HS, a simple ring gear H2_HS, a coupled carrier ST134_HS and a simple carrier ST2_HS. In principle therefore, this main gearset is a fourcarrier, five-shaft planetary transmission reduced to a twocarrier unit with five input elements, not connected with one another, and one output element. As before, the planetary gears of the simple carrier ST2_HS mesh with the simple ring gear H2_HS and the second sun gear S2_HS, but the planetary gears of the "new" coupled carrier ST134_HS mesh with the coupled ring gear H134_HS and the other three sun gears S1_HS, S3_HS, S4_HS of the main gearset, these two "new" sun gears S3_HS, S4_HS having different numbers of teeth. The sun gears S1_HS, S2_HS coupled with one another form the first input element of the main gearset and are connected with the output element of clutch B. The ring gear H2_HS forms the second input element of the main gearset and is connected with the output element of clutch A. The carrier ST134_HS forms the third input element of the main gearset and is connected with the output elements of the shift elements E and D. The "new" third sun gear S3_HS forms the fourth input element of the main gearset, which is now connected exclusively to the output element of brake C. The "new" fourth sun gear S4_HS forms the fifth input element of the main gearset, which is connected exclusively with the output element of clutch F. Finally, the ring gear H134_HS and the carrier ST2_HS are coupled with one another to form the output element of the main gearset HS, which is connected to the drive output shaft AB.

Figure 5C:
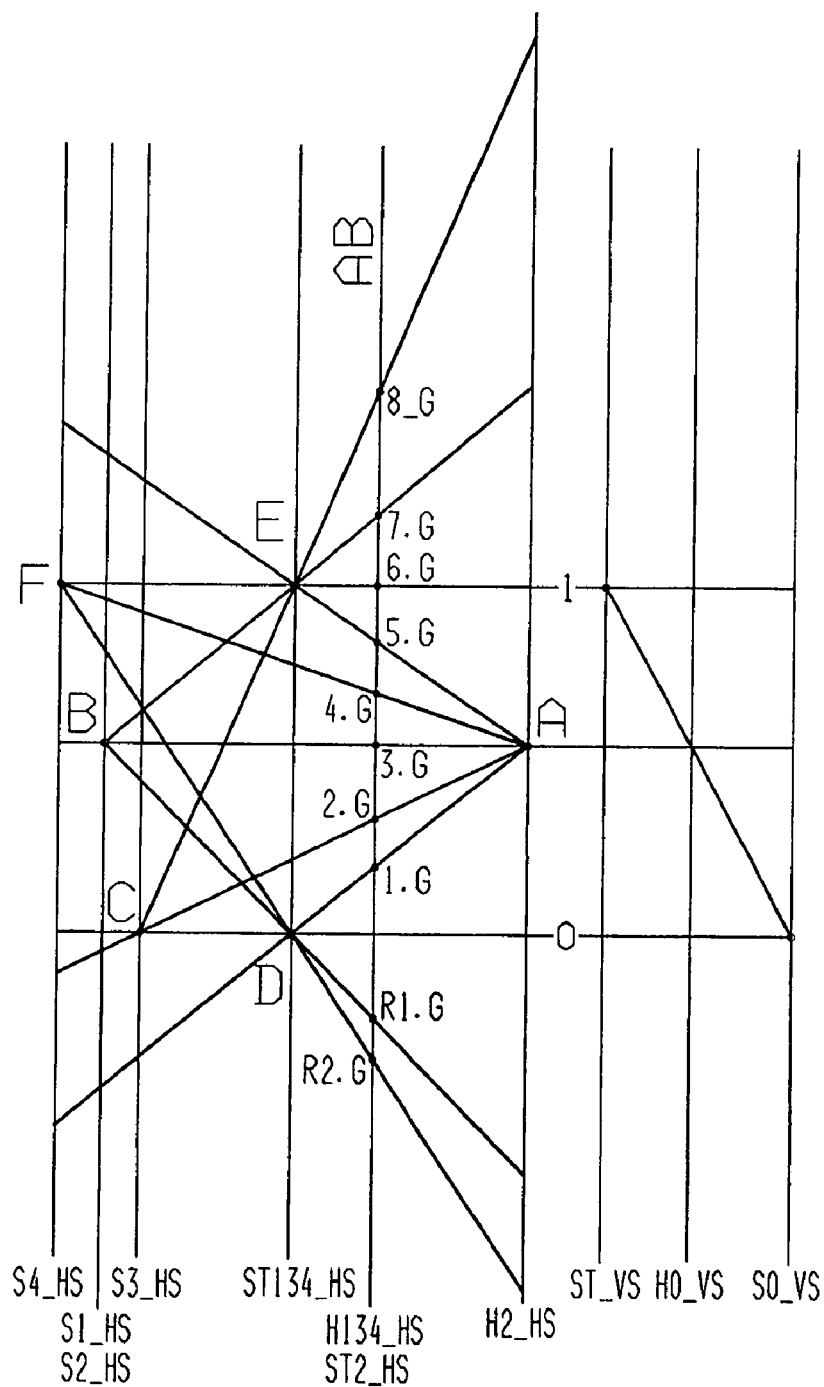
FIG. 5C is a speed diagram of a transmission with a modified main gearset compared with that of FIG. 5A.

In the example shown in FIG. 5C, the fixed transmission ratio of the first of the four coupled planetary gearsets of the main gearset, defined by the number of teeth on the ring gear H134_HS and the sun gear S1_HS, is larger than the fixed transmission ratio of the third of the four coupled planetary gearsets of the main gearset, defined by the ratio of the numbers of teeth on the ring gear H134_HS and the sun gear S3_HS and by the ratio between the numbers of teeth on the two steps of the stepped planetary gears P13_HS, and smaller than the fixed transmission ratio of the fourth of the four coupled planetary gearsets of the main gearset, defined by the ratio between the numbers of teeth on the ring gear H134_HS and the sun gear S4_HS and by the ratio between the numbers of teeth on the two steps of the stepped planetary gears P13_HS. The result of this is, on one hand, that the line of the fourth input element S3_HS of the main gearset in the speed diagram is close to the line of the first input element S1_HS and S2_HS of the main gearset to the right thereof, i.e., closer to the line of the drive output element H134_HS and ST2_HS of the main gearset than is the line of the first input element S1_HS and S2_HS of the main gearset. On the other hand, a further result is that the line of the fifth input element S4_HS of the main gearset in the speed diagram is close to the line of the first input element S1_HS and S2_HS of the main gearset to the left thereof, i.e., further away from the line of the drive output element H134_HS and ST2_HS of the main gearset than is the line of the first input element S1_HS and S2_HS of the main gearset. Thus, in relation to the input elements of the main gearset, all three of the shift elements B, C and F lie on different lines in the speed diagram.

Figure 6:
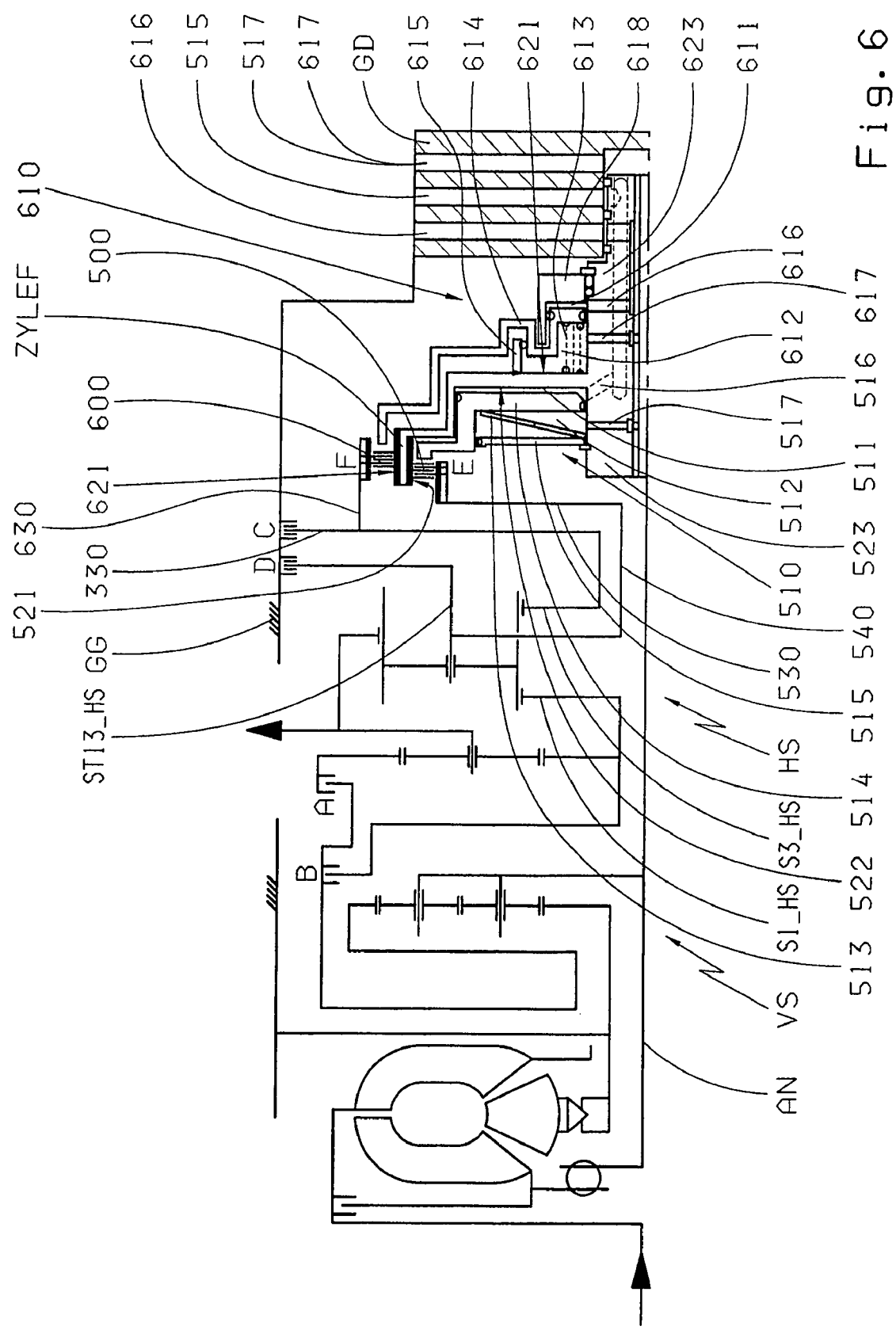
FIG. 6 is an example of a fifth transmission layout according to the invention, with a shift element arrangement modified compared with that of FIG. 4.

Referring to FIG. 6, a fifth example transmission layout according to the present invention will now be explained, which is based on the transmission layout described earlier with reference to FIG. 4, with differences compared with the latter that concern essentially only the spatial arrangement of the clutch E. As can be seen in FIG. 6, the two clutches E and F now form a structural group easy to preassemble from the standpoint of production technology, comprising a disk carrier ZYLEF common to the two clutches E and F, the servomechanisms 510, 610 of the clutches E and F, and the disk sets 500, 600 of the two clutches E and F. This disk carrier ZYLEF forms the input element of both clutches E and F and is accordingly connected rotationally fixed to the drive input shaft AN. For clutch E the disk carrier ZYLEF is made as an outer disk carrier to hold the outer disks of the disk set 500 of clutch E preferably made as externally toothed steel disks, while for clutch F it is made as an inner disk carrier to hold the inner disks of the disk set 600 of clutch F preferably made as internally toothed lining disks. The disk set 600 of clutch F is spatially arranged in an area radially over the disk set 500 of clutch E, and the entire structural group consisting of the clutches E and F is arranged on the side of the main gearset HS facing away from the transfer gearset VS.

Of course, instead of the steel disks (with no frictional lining) and lining disks arranged in alternation, steel disks lined on one side with a frictional lining can be used, and then in each case an externally toothed lined steel disk and an internally toothed lined disk have to be combined in alternation to form a disk set. Of course, instead of the proposed steel disks, disks made of carbon or carbon fiber, or other suitable composite materials can also be used.

Geometrically, the disk carrier ZYLEF common to the two clutches E and F, is made essentially in the form of a pot open in the direction of the main gearset HS, with a cylindrical section 521, on whose inside diameter the outer disks of the disk set 500 of clutch E are arranged, with an at least largely disk-shaped section (pot bottom) 522, which extends from the end of the cylindrical section 521 remote from the main gearset HS radially inward, with a first hub section 523 associated with the clutch E, which extends starting from the inside diameter of the pot bottom 522 axially in the direction of the main gearset HS and is connected at its end near the main gearset with the drive input shaft AN, and with a second hub section 623 associated with the clutch F, which extends starting from the inside diameter of the pot bottom 522 axially in the direction away from the main gearset HS and is mounted to rotate at its end remote from the main gearset on a housing cover GD connected in a rotationally fixed manner to the transmission housing GG. The outer diameter of the cylindrical section 521 is indexed 621 as an indication that this section is also associated with the clutch F. On this outer diameter, in fact, is provided a carrier profile for holding the inner disks of the disk set 600 of clutch F.

The servomechanism 510 of clutch E, comprising a pressure chamber 511, a pressure equalization chamber 512, a piston 514, a restoring element 513 and a diaphragm plate 515, is arranged radially above the first hub section 523 of the disk carrier ZYLEF completely within a cylindrical space formed by the disk carrier ZYLEF, in particular by its cylindrical section 521. The piston 514 is mounted to move axially on this disk carrier ZYLEF. Correspondingly, the servomechanism 510 always rotates at the speed of the drive input shaft AN. To compensate the rotational pressure of the rotating pressure chamber 511 of the servomechanism 510, dynamic pressure compensation is provided by the pressure equalization chamber 512 that can be filled with unpressurized lubricant, this pressure equalization chamber 512 being arranged closer to the main gearset HS than is the pressure chamber 511. The pressure chamber 511 is formed by a casing surface of the disk carrier ZYLEF and the piston 514. The pressure equalization chamber 512 is formed by the piston 514 and the diaphragm plate 515, which is fixed axially on the hub section 523 of the disk carrier ZYLEF, can move axially relative to the piston 515, and is sealed against lubricant. The piston 514 is pre-stressed axially against the hub section 523 of the disk carrier ZYLEF by the restoring element 513, in this case for example made as a cup spring. When the pressure chamber 511 is pressurized with pressure medium to engage the clutch E, the piston 514 moves axially in the direction of the main gearset HS and actuates the disk set 500, associated with it, against the spring force of the restoring element 513.

The servomechanism 510 of clutch E is arranged spatially closer to the main and transfer gearsets HS, VS than the servomechanism 610 of clutch F. This servomechanism 610 is spatially arranged at least mainly in an area radially over the second hub section 623 of the disk carrier ZYLEF, and is also mounted to move axially on the disk carrier ZYLEF. Correspondingly, the servomechanism 610 also always rotates at the speed of the drive input shaft AN. The servomechanism 610 of clutch F comprises a pressure chamber 611, a pressure equalization chamber 612, a piston 614 formed in a meander shape in sections, a restoring element 613, a cylindrical diaphragm plate 615 and a pot-shaped support disk 618. To compensate the rotational pressure of the rotating pressure chamber 611 of the servomechanism 610, dynamic pressure compensation is provided by the pressure equalization chamber 612. For this, the cylindrical diaphragm plate 615 is fixed on a defined diameter, sealed against lubricant, on the disk-shaped section 522 of the disk carrier ZYLEF (in the example shown, by welding), axially relative to the axially adjacent piston 614 and sealed against lubricant, so that together with the casing surface 621 of the disk carrier ZYLEF located under the diaphragm plate 615 and the casing surface of the piston 614 located radially under the diaphragm plate, it forms the pressure equalization chamber 612. The pressure equalization chamber 612 of the servomechanism 610 of clutch F and the pressure chamber 511 of the servomechanism 510 of clutch E are thus arranged directly adjacent to one another and separated from one another only by a casing surface of the disk carrier ZYLEF common to the two clutches E and F. On the side of the pressure equalization chamber 612 facing away from the main gearset HS and the pressure chamber 511, is arranged the pressure chamber 611 of the servomechanism 610. This pressure chamber 611 is formed by the piston 615, the support disk 618 and an axial section of the hub 623. For this, the support disk 618 is fixed and sealed against pressure medium on the hub 623. Radially above the section of the hub 623 that forms the pressure chamber 612, there extends a cylindrical section of this pot-shaped support disk 618 axially in the direction of the main gearset HS (or axially in the direction of the pressure chamber 511), which can move axially relative to a corresponding section of the piston 614, sealed against pressure medium. Along its further geometric course, the piston 614 extends at least largely along the outer contour of the support disk 618 and the upper area of the disk carrier ZYLEF, radially outward and axially toward the main gearset HS, as far as the side of the disk set 600 of clutch F associated with it that is remote from the main gearset. The piston 614 is axially pre-stressed by the restoring element 613, here for example made as a spiral spring packet positioned axially between the disk-shaped disk carrier section 621 and the piston 614. When the pressure chamber 611 is pressurized with pressure medium to engage the clutch F, the piston 614 moves axially in the direction of the main gearset HS and actuates the disk set 600 associated with it against the spring force of the restoring element 613.

The mounting of the disk carrier ZYLEF on the housing cover GD fixed to the transmission housing enables comparatively simply designed pressure medium and lubricant supply to the two clutches E, F through corresponding ducts or holes which pass partly within the housing cover GD and partly within the hub of the disk carrier ZYLEF. The pressure medium supply to the pressure chamber 511 of the servomechanism 510 of clutch E is indexed 516, the lubricant supply to the pressure equalization chamber 512 of the servomechanism 510 of clutch E is indexed 517, the pressure medium supply to the pressure chamber 611 of the servomechanism 610 of clutch F is indexed 616, and the lubricant supply to the pressure equalization chamber 612 of the servomechanism 610 of clutch F is indexed 617.

The output element 530 of clutch E is made as an inner disk carrier which extends starting from the disk set 500 of clutch E, axially adjacent to the servomechanism 510 of clutch E and radially inward as far as just above the drive input shaft AN, and is connected rotationally fixed in its hub area to the carrier shaft 540. This carrier shaft 540 extends axially toward the transfer gearset VS as far as an area between the third sun gear S3_HS (remote from the transfer gearset) and the (spatially central) first sun gear S1_HS of the main gearset HS, thereby passing centrally through the third sun gear S3_HS of the main gearset HS in the axial direction. In the area axially between the sun gears S3_HS and S1_HS the carrier shaft 540 is connected rotationally fixed to the carrier plate of the coupled carrier ST13_HS of the main gearset HS remote from the transfer gearset.

The output element 630 of clutch F is made as an outer disk carrier which extends starting from the disk set 600 of clutch F radially inward and axially adjacent to the output element (or inner disk carrier) 530 of clutch E, as far as just above the carrier shaft 540, and is connected rotationally fixed in its hub area to the third sun gear S3_HS of the main gearset HS (remote from the transfer gearset). The output element 330 of brake C, which is also kinematically coupled to the third sun gear S3_HS of the main gearset HS, is in this case connected rotationally fixed, for example in the area of the outer diameter of the outer disk carrier 630 of clutch F, to the outer disk carrier 630.

In other respects the component arrangement shown in FIG. 6 is essentially the same as the arrangement already shown in FIG. 4.

Figure 7:
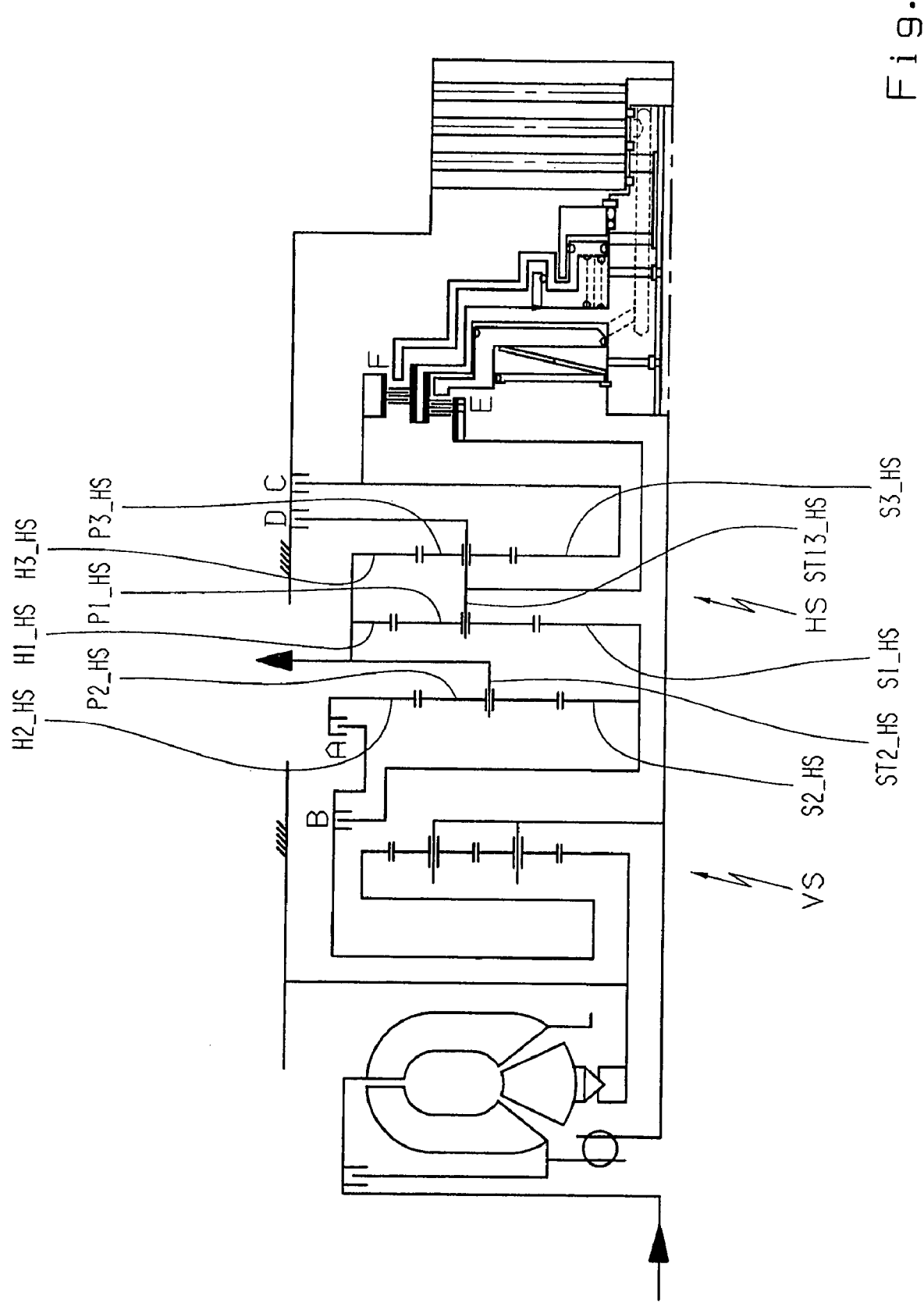
FIG. 7 is an example of a sixth transmission layout according to the invention, with a main gearset modified by comparison with that of FIG. 6.

Of course, the component arrangement described with reference to FIG. 6 can also be combined with another type of main gearset, for example as already described with reference to FIG. 5A, 5B or 5C. A corresponding sixth example transmission layout according to the present invention is shown in FIG. 7. In this case the main gearset HS is a three-carrier, four-shaft planetary transmission reduced to a two-carrier planetary transmission, and now comprises three sun gears S1_HS, S2_HS and S3_HS, three ring gears H1_HS, H2_HS and H3_HS, a coupled carrier ST13_HS with planetary gears P1_HS and P3_HS mounted to rotate on it, and a simple carrier ST2_HS with planetary gears P2_HS mounted to rotate on it. The sun gear S1_HS, the ring gear H1_HS and the planetary gears P1_HS that mesh with this sun gear S1_HS and ring gear H1_HS are associated with the first of the three individual planetary gearsets of the main gearset HS. The sun gear S2_HS, the ring gear H2_HS and the planetary gears P2_HS that mesh with the sun gear S2_HS and ring gear H2_HS are associated with the second of the three individual planetary gearsets of the main gearset HS. Finally, the sun gear S3_HS, the ring gear H3_HS and the planetary gears P3_HS which mesh with this sun gear S3_HS and ring gear H3_HS are associated with the third of the three individual planetary gearsets of the main gearset HS. Spatially, the first of the three individual planetary gearsets of the main gearset HS is again arranged axially between the second of the three individual planetary gearsets of the main gearset HS close to the transfer gearset, and the third of the three individual planetary gearsets of the main gearset HS remote from the transfer gearset. The two sun gears S2_HS and S1_HS are permanently connected with one another. As a further kinematic coupling of the main gearset HS, a fixed connection is provided between the (simple) carrier ST2_HS and the two ring gears H1_HS and H3_HS. The so constituted main gearset HS of the sixth transmission layout according to the invention shown in FIG. 7 corresponds in its function to the main gearset HS shown in FIG. 5A, whose first and third individual planetary gearsets are coupled by a common carrier ST13_HS to stepped planetaries P13_HS mounted to rotate on it.

Figure 8:
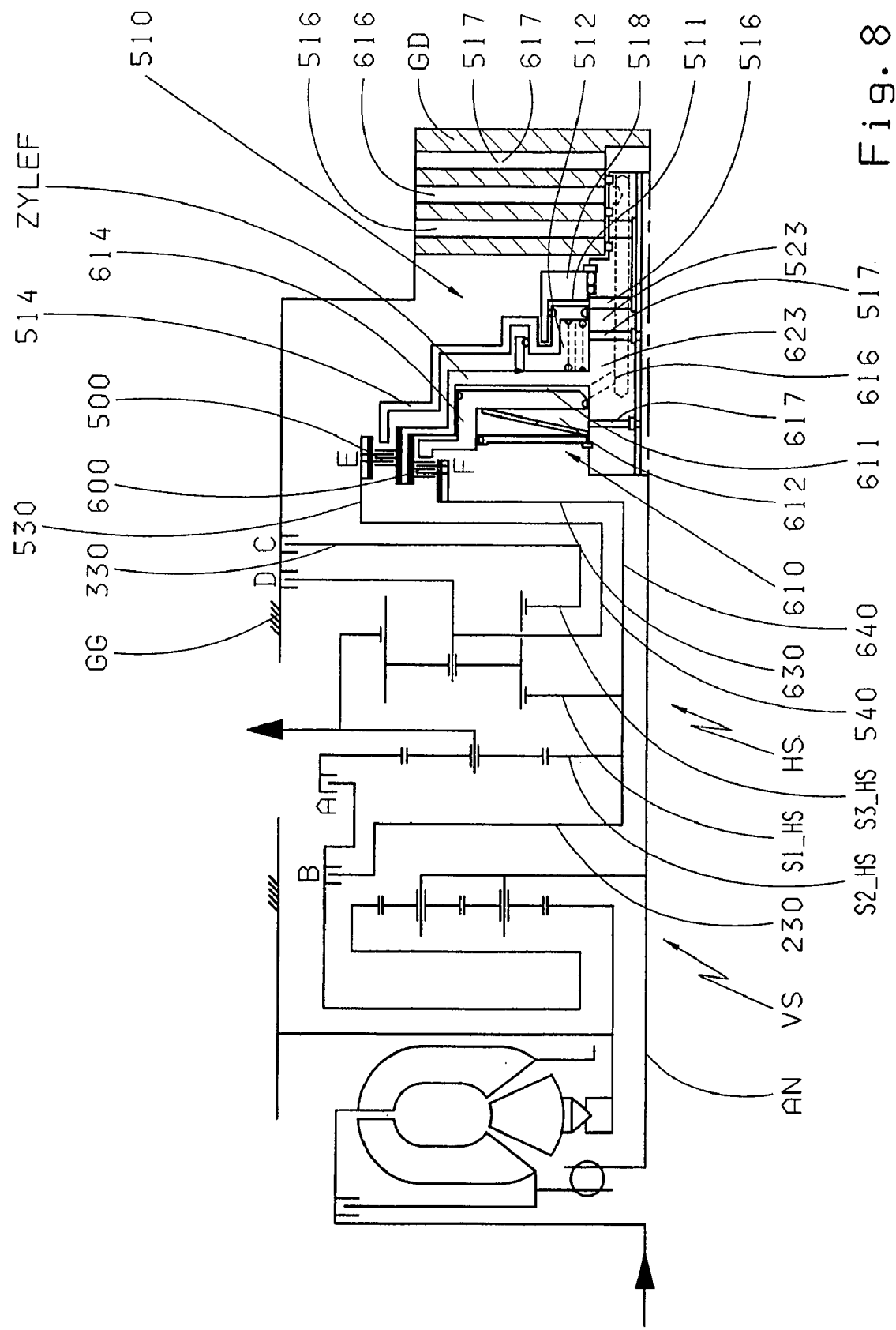
FIG. 8 is an example of a seventh transmission layout according to the invention, with a shift element arrangement modified by comparison with that of FIG. 6.

Referring to FIG. 8, a seventh example transmission layout according to the present invention will now be explained, which is based on the transmission layout according to FIG. 6 described earlier, the changes compared with the latter concerning essentially only the design of the structural group formed by the two clutches E and F. As before, this structural group is arranged on the side of the main gearset HS facing away from the transfer gearset VS and comprises a disk carrier ZYLEF common to the two clutches E and F, the servomechanisms 510, 610 of the two clutches E and F, and the disk sets 500, 600 of the two clutches E and F. The disk carrier ZYLEF forms the input element for both of the clutches E and F, and is correspondingly connected rotationally fixed with the drive input shaft AN.

As can be seen in FIG. 8, the disk set 600 of clutch F is now spatially arranged radially under the disk set 500 of clutch E. Correspondingly, the disk carrier ZYLEF is made for clutch F as an outer disk carrier to hold outer disks of the (now radially inner) disk set 600 of clutch F made, for example, as externally toothed steel disks, and for clutch E as an inner disk carrier to hold inner disks of the (now radially outer) disk set 500 of clutch E made, for example, as internally toothed lining disks. Correspondingly, the spatial position of the servomechanisms 510 and 610 of the two clutches E, F is also exchanged compared with FIG. 6, and the servomechanism 610 of clutch F is now arranged closer to the main gearset HS than the servomechanism 510 of clutch E. Accordingly, the design of these servomechanisms 510, 610, described in detail earlier with reference to FIG. 6, can be interpreted easily, so that there is no need to described it again in detail here. To avoid misunderstandings, at this point only the differing and new indexes will be commented upon specifically. Thus, in FIG. 8 the hub section of the disk carrier ZYLEF close to the main gearset—now associated with clutch F—is indexed 623, and the hub section of the disk carrier ZYLEF remote from the main gearset—now associated with clutch E—is indexed 523. To form the pressure chamber 511 of the servomechanism 510 of clutch E, a support disk 518 is provided, which is fixed pressure-medium tight on the hub section 523 remote from the main gearset and can move axially, sealed against pressure medium, relative to the piston 514 of this servomechanism 510, which is formed in a meander shape in sections. In contrast to FIG. 6, the pressure chamber 611 of the servomechanism 610 of clutch F and the pressure equalization chamber 512 of the servomechanism 510 of clutch E are now arranged directly adjacent to one another and separated from one another only by a casing surface of the disk carrier ZYLEF.

As can also be seen in FIG. 8, the output element 630 of the clutch F, otherwise than in FIG. 6, is now formed as an inner disk carrier which extends starting from the radially inner disk set 600 of the structural group comprising the clutches E and F, radially inward and axially adjacent to the servomechanism 610 of clutch F, as far as just above the drive input shaft AN, and is connected in a rotationally fixed manner in its hub area with a third sun shaft 640. This third sun shaft 640 overlaps the drive input shaft AN radially and extends axially in the direction of the transfer gearset VS, thereby passing centrally completely through the main gearset HS in the axial direction. This third sun shaft 640 is connected in a rotationally fixed manner, on one hand, also to the (spatially central) first sun gear S1_HS and the second sun gear S2_HS (close to the transfer gearset) of the main gearset HS and, on the other hand, (spatially in an area axially between the transfer gearset VS and the main gearset HS) to the output element 230 of the clutch B. The output element 330 of the brake C is connected in a rotationally fixed manner directly to the third sun gear S3_HS (remote from the transfer gearset) of the main gearset HS, in the example shown partly axially directly adjacent to the main gearset HS.

In contrast to FIG. 6, in FIG. 8 the output element 530 of the clutch E is now made as an outer disk carrier. Starting from the radially outer disk set 500 of the structural group comprising the clutches E and F, this outer disk carrier 530 of the clutch E extends in part at least largely parallel to and axially between the output element (inner disk carrier) 630 of clutch F and the output element 330 of the brake C, radially inward as far as a diameter just above the third sun shaft 640. In its hub area the inner disk carrier 530 of clutch E is again connected rotationally fixed to the carrier shaft 540, which encloses the third sun shaft 640 radially. As in FIG. 6, the carrier shaft 540 passes through the third sun gear S3_HS (remote from the transfer gearset) of the main gearset HS in the axial direction, and is connected in a rotationally fixed manner in its area axially between the sun gears S3_HS and S1_HS to the carrier plate of the coupled carrier ST13_HS (remote from the transfer gearset) of the main gearset HS.

In other respects, the component arrangement shown in FIG. 8 corresponds to the arrangement already shown in FIG. 6.

Figure 9:
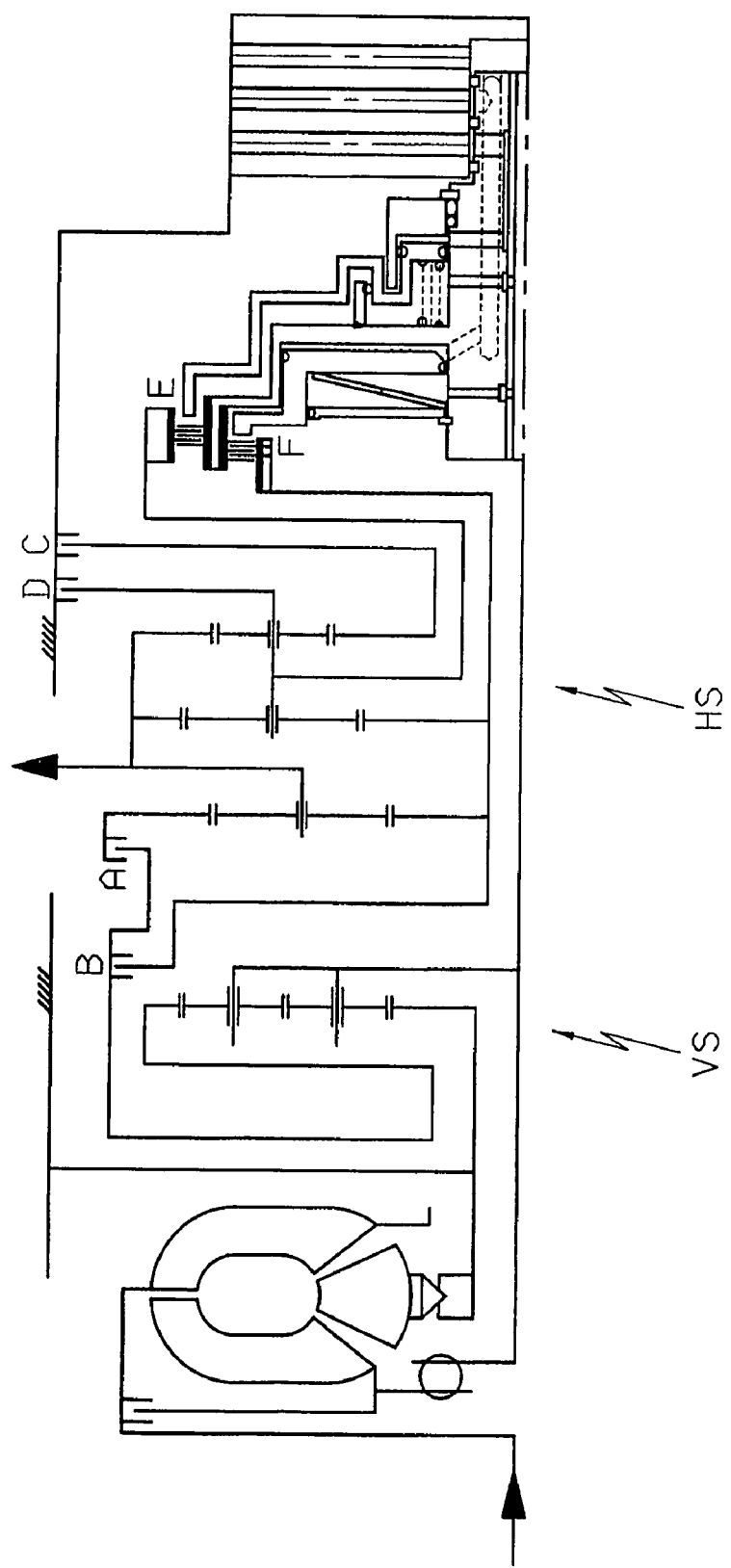
FIG. 9 is an example of an eighth transmission layout according to the invention, with a main gearset modified by comparison with that of FIG. 8.

Of course, the component arrangement described with reference to FIG. 8 can also be combined with another type of main gearset, for example as described with reference to FIG. 5A, 5B or 5C. A corresponding eighth example transmission layout according to the present invention is shown in FIG. 9. In this case the main gearset HS is a three-carrier, four-shaft planetary transmission reduced to a two-carrier planetary transmission, and is therefore constructed identically to the main gearset HS shown in FIG. 7, so that there is no need here to repeat the detailed description thereof.

REFERENCE NUMERALS

A first shift element, clutch
B second shift element, clutch
C third shift element, brake
D fourth shift element, brake
E fifth shift element, clutch
F sixth shift element, clutch
AN drive input shaft
AB drive output shaft
GG transmission housing
GD housing cover
GN hub on the housing wall
GW housing wall
ZYL cylinder
ZYLEF disk carrier common to the fifth and sixth shift elements
VS transfer gearset
HO_VS ring gear of the transfer gearset
SO_VS sun gear of the transfer gearset
ST_VS (coupled) carrier of the transfer gearset
P1_VS inner planetary gear of the transfer gearset
P2_VS outer planetary gear of the transfer gearset
HS main gearset
HO_HS (single) ring gear of the main gearset
H1_HS first ring gear of the main gearset
H13_HS coupled (first) ring gear of the main gearset
H134_HS coupled (first) ring gear of the main gearset
H2_HS second ring gear of the main gearset
H3_HS third ring gear of the main gearset
S1_HS first sun gear of the main gearset
S2_HS second sun gear of the main gearset
S3_HS third sun gear of the main gearset
S4_HS fourth sun gear of the main gearset
ST_HS coupled (single) carrier of the main gearset
ST1_HS first carrier of the main gearset
ST13_HS coupled (first) carrier of the main gearset
ST134_HS coupled (first) carrier of the main gearset
ST2_HS second carrier of the main gearset
P1_HS long (first) planetary gear of the main gearset
P13_HS coupled long planetary gear of the main gearset
P2_HS short (second) planetary gear of the main gearset
P3_HS third planetary gear of the main gearset
PL_HS first planetary gear of the main gearset
PLa_HS outer planetary gear of the main gearset
PLi_HS inner planetary gear of the main gearset
100 disks of the first shift element
110 servomechanism of the first shift element
120 input element of the first shift element
130 output element of the first shift element
131 cylindrical section of the output element of the first shift element
132 disk-shaped section of the output element of the first shift element
133 hub of the output element of the first shift element
140 second sun shaft
200 disks of the second shift element
210 servomechanism of the second shift element
220 input element of the second shift element
221 cylindrical section of the input element of the second shift element
222 disk-shaped section of the input element of the second shift element
223 hub of the input element of the second shift element
230 output element of the second shift element
231 cylindrical section of the output element of the second shift element
232 disk-shaped section of the output element of the second shift element
240 first sun shaft
300 disks of the third shift element
330 output element of the third shift element
400 disks of the fourth shift element
430 output element of the fourth shift element
500 disks of the fifth shift element
510 servomechanism of the fifth shift element
511 pressure chamber of the servomechanism of the fifth shift element
512 pressure equalization chamber of the servomechanism of the fifth shift element
513 restoring element of the servomechanism of the fifth shift element
514 piston of the servomechanism of the fifth shift element
515 diaphragm plate of the servomechanism of the fifth shift element
516 pressure medium supply to the pressure chamber of the servomechanism of the fifth shift element
217 lubricant supply to the pressure equalization chamber of the servomechanism of the fifth shift element
518 support disk of the servomechanism of the fifth shift element
520 input element of the fifth shift element
521 cylindrical section of the input element of the fifth shift element
522 disk-shaped section of the input element of the fifth shift element
523 hub of the input element of the fifth shift element
530 output element of the fifth shift element
540 carrier shaft
600 disks of the sixth shift element
610 servomechanism of the sixth shift element
611 pressure chamber of the servomechanism of the sixth shift element
612 pressure equalization chamber of the servomechanism of the sixth shift element
613 restoring element of the servomechanism of the sixth shift element
614 piston of the servomechanism of the sixth shift element
615 diaphragm plate of the servomechanism of the sixth shift element
616 pressure medium supply to the pressure chamber of the servomechanism of the sixth shift element
617 lubricant supply to the pressure equalization chamber of the servomechanism of the sixth shift element
618 support disk of the servomechanism of the sixth shift element
620 input element of the sixth shift element
621 cylindrical section of the input element of the sixth shift element
622 disk-shaped section of the input element of the sixth shift element
623 hub of the input element of the sixth shift element
630 output element of the sixth shift element
640 third sun shaft

The invention claimed is:
1. A multi-stage automatic transmission comprising:
a drive input shaft (AN) and a drive output shaft (AB);
a transfer gearset (VS), configured as a double planetary gearset, having an input element fixed to the drive input shaft (AN);

a main gearset (HS), configured as a coupled planetary gearset, with a plurality of uncoupled input elements and an output element that is fixed to the drive output shaft (AB);
at least first, second, third, fourth, fifth, and sixth shift elements (A, B, C, D, E, F);
an output element of the transfer gearset (VS) rotates at a slower speed than an input rotational speed of the drive input shaft (AN);
a first element of the transfer gearset (VS) is connected with a transmission housing (GG) of the multi-stage automatic transmission;
an input element (120) of the first shift element (A) is connected with the output element of the transfer gearset (VS);
an output element (130) of the first shift element (A) is connected with a second input element of the main gearset (HS);
an input element (220) of the second shift element (B) is connected with the output element of the transfer gearset (VS);
an output element (230) of the second shift element (B) is connected with a first input element of the main gearset (HS);
an input element of the third shift element (C) is connected with the transmission housing (GG);
an output element (330) of the third shift element (C) is connected with one of the first input element of the main gearset (HS) and a further input element of the main gearset (HS);
an input element of the fourth shift element (D) is connected with the transmission housing (GG);
an output element (430) of the fourth shift element (D) is connected with a third input element of the main gearset (HS);
an input element (520) of the fifth shift element (E) is connected with the drive input shaft (AN);
an output element (530) of the fifth shift element (E) is connected to the third input element of the main gearset (HS);
an input element (620) of the sixth shift element (F) is connected with the drive input shaft (AN);
an output element (630) of the sixth shift element (F) is connected with one of the first input element of the main gearset (HS) and the further input element of the main gearset (HS);
the sixth shift element (F), when spatially viewed, is located at least substantially on a side of the main gearset (HS) opposite from the transfer gearset (VS); and
the third shift element (C) is one of, when spatially viewed, located at least partially on the side of the main gearset (HS) opposite from the transfer gearset (VS) or at least partially radially over the main gearset (HS).

2. The multi-stage automatic transmission according to claim 1, wherein the sixth shift element (F) is located close to an end of the transmission housing (GG).

3. The multi-stage automatic transmission according to claim 1, wherein a servomechanism (610), for actuating a disk set (600) of the sixth shift element (F), is arranged adjacent to one of an end of the transmission housing (GG) and an end housing cover (GD), which is connected in a rotationally fixed manner with the transmission housing (GG), and the disk set (600) of the sixth shift element (F) is actuated axially, when engaging, in a direction of one of the transfer gearset (VS) and the main gearset (HS).

4. The multi-stage automatic transmission according to claim 1, wherein a servomechanism (610) of the sixth shift element (F), when spatially viewed, is located at least substantially within an input element (620) of the sixth shift element (F), which is configured as a disk carrier and always rotates at the input rotational speed of the drive input shaft (AN).

5. The multi-stage automatic transmission according to claim 1, wherein the input element (620) of the sixth shift element (F) is rotatably supported by a hub (GN) fixed to the transmission housing (GG), the hub (GN) extends axially from one of an end of the transmission housing (GG) adjacent the main gearset (HS) and an end housing cover (GD) adjacent the main gearset (HS), toward the main gearset (HS); and
at least one of a pressure medium supply, for supplying a pressure medium to a pressure chamber (611) of the servomechanism (610) of the sixth shift element (F), and a lubricant supply, for supplying a lubricant to a pressure equalization chamber (612) for dynamically compensating for pressure of the rotating pressure chamber (611) of the servomechanism (610) of the sixth shift element (F), pass partly within this hub (GN).

6. The multi-stage automatic transmission according to claim 1, wherein one of a disk set (300) of the third shift element (C) and a brake belt of the third shift element (C) is located closer to at least one of the main gearset (HS) and the transfer gearset (VS) than a disk set (600) of the sixth shift element (F).

7. The multi-stage automatic transmission according to claim 6, wherein the disk set (300) of the third shift element (C) is located axially adjacent the disk set (600) of the sixth shift element (F).

8. The multi-stage automatic transmission according to claim 1, wherein one of a disk set (300) of the third shift element (C) and a brake belt of the third shift element (C) is located radially, when viewed axially, over the disk set (600) of the sixth shift element (F).

9. The multi-stage automatic transmission according to claim 1, wherein the fourth shift element (D) is adjacent the main gearset (HS) on a side of the main gearset (HS) facing away from the transfer gearset (VS).

10. The multi-stage automatic transmission according to claim 1, wherein the fourth shift element (D) is adjacent the main gearset (HS) and is located between main gearset (HS) and the transfer gearset (VS).

11. The multi-stage automatic transmission according to claim 1, wherein the fourth shift element (D) is closer to the transfer gearset (VS) than the third shift element (C).

12. The multi-stage automatic transmission according to claim 1, wherein the fifth shift element (E) is located on a side of the main gearset (HS) opposite the sixth shift element (F).

13. The multi-stage automatic transmission according to claim 1, wherein the first shift element (A) is located closer to the main gearset (HS) than the second shift element (B);
the first shift element (A), when spatially viewed, is axially located between the transfer gearset (VS) and the main gearset (HS); and
a disk set (500) of the fifth shift element (F), when spatially viewed, is axially located between the first shift element (A) and the main gearset (HS).

14. The multi-stage automatic transmission according to claim 1, wherein at least one of a disk set (100) of the first shift element (A) and a disk set (200) of the second shift element (B) are, when spatially viewed, at least partially radially over the fifth shift element (E).

15. The multi-stage automatic transmission according to claim 1, wherein the fifth shift element (E) is arranged on a side of the main gearset (HS) opposite the transfer gearset (VS).

16. The multi-stage automatic transmission according to claim 15, wherein the fifth shift element (E) and the sixth shift element (F) form a structural group with a common disk carrier (ZYLEF) which is connected to the drive input shaft (AN) and on which a servomechanism (510) of the fifth shift element (E) and a servomechanism (610) of the sixth shift element (F) are supported for moving axially.

17. The multi-stage automatic transmission according to claim 15, wherein a servomechanism (510) of the fifth shift element (E) is separated from a servomechanism (610) of the sixth shift element (F) solely by a casing surface of a disk carrier (ZYLEF), and the disk carrier is common to both the fifth shift element (E) and the sixth shift element (F).

18. The multi-stage automatic transmission according to claim 15, wherein a disk carrier (ZYLEF), common to both the fifth shifting element (E) and the sixth shift element (F), is rotatably supported one of on a housing cover (GD) which is fixed to the transmission housing (GG), a wall which is fixed to the transmission housing (GG) and a hub which is fixed to the transmission housing (GG); and
  at least one of a pressure medium is supplied to both a pressure chamber (511) of a servomechanism (510) of the fifth shift element (E) and a pressure chamber (611) of a servomechanism (610) of the sixth shift element (F) and a lubricant is supplied to both a pressure equalization chamber (512) of a servomechanism (510) of the fifth shift element (E) and a pressure equalization chamber (612) of a servomechanism (610) of the sixth shift element (F), for dynamic pressure compensation of both the pressure chamber (511) of the servomechanism (510) of the fifth shift element (E) and the pressure chamber (611) of the servomechanism (610) of the sixth shift element (F), at least one of the pressure medium and the lubricant flow partly within one of the housing cover (GD), the wall fixed to the transmission housing (GG) and the hub fixed to the transmission housing (GG).

19. The multi-stage automatic transmission according to claim 15, wherein a disk set (500) of the fifth shift element (E), when spatially viewed, is at least substantially radially located over a disk set (600) of the sixth shift element (F).

20. The multi-stage automatic transmission according to claim 15, wherein a pressure chamber (611) of a servomechanism (610) of the sixth shift element (F) is located closer to the main gearset (HS) than a pressure chamber (511) of a servomechanism (510) of the fifth shift element (E).

21. The multi-stage automatic transmission according to claim 15, wherein a disk set (600) of the sixth shift element (F), when spatially viewed, is at least substantially radially located over a disk set (500) of the fifth shift element (E).

22. The multi-stage automatic transmission according to claim 15, wherein a pressure chamber (511) of a servomechanism (510) of the fifth shift element (E) is located closer to the main gearset (HS) than a pressure chamber (611) of a servomechanism (610) of the sixth shift element (F).

23. The multi-stage automatic transmission according to claim 1, wherein a servomechanism (510), for actuating a disk set (500) of the fifth shift element (E), is located on a side of the disk set (500) of the fifth shift element (E) opposite the main gearset (HS), and actuates the disk set (500) of the fifth shift element (E) axially toward the main gearset (HS) upon engagement.

24. The multi-stage automatic transmission according to claim 1, wherein the first shift element (A) is closer to the main gearset (HS) than the second shift element (B), and the first shift element (A), when spatially viewed, is axially located between the transfer gearset (VS) and the main gearset (HS).

25. The multi-stage automatic transmission according to claim 1, wherein the transfer gearset (VS) comprises a sun gear (SO_VS), an ring gear (HO_VS) and a coupled carrier (ST_VS), which radially supports inner and outer planetary gears (P1_VS, P2_VS);
  the inner planetary gears (P1_VS) of the transfer gearset (VS) mesh with the sun gear (SO_VS) and the outer planetary gears (P2_VS) of the transfer gearset (VS);
  the outer planetary gears (P2_VS) of the transfer gearset (VS) mesh with the inner planetary gears (P1_VS) and the ring gear (HO_VS) of the transfer gearset (VS);
  the carrier (ST_VS) of the transfer gearset (VS) forms the input element of the transfer gearset (VS) which is fixed to the drive input shaft (AN);
  the ring gear (HO_VS) of the transfer gearset (VS) forms the output element of the transfer gearset (VS) that is connected with the plurality of input elements of the main gearset (HS);
  the sun gear (SO_VS) of the transfer gearset is fixed to the transmission housing (GG);
  the main gearset (HS) is a two-carrier, four-shaft transmission structured as a Ravigneaux gearset with first and second sun gears (S1_HS, S2_HS), a ring gear (HO_HS), and a coupled carrier (ST_HS) which rotatably supports long planetary gears (P1_HS) and short planetary gears (P2_HS);
  the long planetary gears (P1_HS) of the main gearset (HS) mesh with the ring gear (HO_HS) and the first sun gear (S1_HS) of the main gearset (HS);
  the short planetary gears (P2_HS) of the main gearset (HS) mesh with the long planetary gears (P1_HS) and the second sun gear (S2_HS) of the main gearset (HS);
  the first sun gear (S1_HS) of the main gearset (HS) forms the first input element of the main gearset (HS) and is connected to the output element (230) of the second shift element (B), the output element (330) of the third shift element (E), and the output element (630) of the sixth shift element (F);
  the second sun gear (S2_HS) of the main gearset (HS) forms the second input element of the main gearset (HS) and is connected to the output element (130) of the first shift element (A);
  the carrier (ST_HS) of the main gearset (HS) forms the third input element of the main gearset (HS) and is connected with the output element (430) of the fourth and shift element (D) and the output element (530) of the fifth shift elements (E); and
  the ring gear (HO_HS) of the main gearset (HS) forms the output element of the main gearset (HS) and is connected to the drive output shaft (AB).

26. The multi-stage automatic transmission according to claim 1, wherein the transfer gearset (VS) comprises a sun gear (SO_VS), a ring gear (HO_VS) and a coupled carrier (ST_VS), which rotatably supports inner and outer planetary gears (P1_VS, P2_VS);
  the inner planetary gears (P1_VS) of the transfer gearset (VS) mesh with the sun gear (SO_VS) and the outer planetary gears (P2_VS) of the transfer gearset (VS);
  the outer planetary gears (P2_VS) of the transfer gearset (VS) mesh with the inner planetary gears (P1_VS) and the ring gear (HO_VS) of the transfer gearset (VS);
  the carrier (ST_VS) of the transfer gearset (VS) forms the input element of the transfer gearset (VS), which is fixed to the drive input shaft (AN);

the ring gear (HO_VS) of the transfer gearset (VS) forms the output element of the transfer gearset (VS), which is fixed to the plurality of input elements of the main gearset (HS);

the sun gear (SO_VS) of the transfer gearset (VS) is fixed to the transmission housing (GG);

the main gearset (HS) is a two-carrier, four-shaft transmission with two coupled individual planetary gearsets, the main gearset comprises first and second sun gears (S1_HS, S2_HS), first and second ring gears (H1_HS, H2_HS), a first carrier (ST1_HS) rotatably supports first planetary gears (PL_HS), and a coupled second carrier (ST2_HS) rotatably supports inner and outer planetary gears (PLi_HS, PLa_HS);

the first planetary gears (PL_HS) of the main gearset (HS) mesh with the first ring gear (H1_HS) and the first sun gear (S1_HS) of the main gearset (HS);

the inner planetary gears (PLi_HS) of the main gearset mesh with the outer planetary gears (PLa_HS) and the second sun gear (S2_HS) of the main gearset (HS);

the outer planetary gears (PLa_HS) of the main gearset (HS) mesh with the inner planetary gears (PLi_HS) and the second ring gear (H2_HS) of the main gearset;

the first sun gear (S1_HS) and the coupled second carrier (ST2_HS) of the main gearset are coupled to form the first input element of the main gearset (HS), and are coupled to the output element (230) of the second shift element (B), the output element (330) of the third shift element (C), and the output element (630) of the sixth shift element (F);

the second sun gear (S2_HS) of the main gearset (HS) forms the second input element of the main gearset (HS) and is connected to the output element (130) of the first shift element (A);

the first carrier (ST1_HS) and the second ring gear (H2_HS) of the main gearset (HS) are coupled to form the third input element of the main gearset (HS), and are coupled to the output element (430) of the fourth shift elements (D) and the output elements (530) of the fifth shift elements (E); and the first ring gear (H1_HS) of the main gearset (HS) forms the output element of the main gearset (HS) and is connected with the drive output shaft (AB).

27. The multi-stage automatic transmission according to claim 1, wherein the transfer gearset (VS) comprises a sun gear (SO_VS), a ring gear (HO_VS) and a coupled carrier (ST_VS) which rotatably supports inner and outer planetary gears (P1_VS, P2_VS);

the inner planetary gears (P1_VS) of the transfer gearset (VS) mesh with the sun gear (SO_VS) and the outer planetary gears (P2_VS) of the transfer gearset (VS);

the outer planetary gears (P2_VS) of the transfer gearset (VS) mesh with the inner planetary gears (P1_VS) and the ring gear (HO_VS) of the transfer gearset (VS);

the carrier (ST_VS) of the transfer gearset (VS) forms the input element of the transfer gearset (VS) that is fixed to the drive input shaft (AN);

the ring gear (HO_VS) of the transfer gearset (VS) forms the output element of the transfer gearset (VS) and is connectable to the plurality of input elements of the main gearset (HS);

the sun gear (SO_VS) of the transfer gearset (VS) is fixed to the transmission housing;

the main gearset (HS) is a reduced three-carrier, five-shaft transmission with first second and third sun gears (S1_HS, S2_HS, S3_HS), a coupled ring gear (H13_HS), a second ring gear (H2_HS), a coupled carrier (ST13_HS), which rotatably supports long planetary gears (P13_HS), and a second carrier (ST2_HS), which rotatably supports short planetary gears (P2_HS);

the first sun gear (S1_HS) of the main gearset (HS) is axially located between the second sun gear (S2_HS) and the third sun gear (S3_HS) of the main gearset (HS);

the long planetary gears (P13_HS) of the main gearset (HS) mesh with the coupled ring gear (H13_HS), the first sun gear (S1_HS) and the third sun gear (S3_HS) of the main gearset (HS);

the short planetary gears (P2_HS) of the main gearset (HS) mesh with the second ring gear (H2_HS) and the second sun gear (S2_HS) of the main gearset (HS);

the first sun gear (S1_HS) of the main gearset (HS) is fixed to the second sun gear (S2_HS) of the main gearset (HS) and form the first input element of the main gearset (HS), and are coupled to the output element (230) of the second shift element (F) and the output element (630) of the sixth shift element (F);

the second ring gear (H2_HS) of the main gearset (HS) forms the second input element of the main gearset (HS) and is connected to the output element (130) of the first shift element (A);

the coupled carrier (ST13_HS) of the main gearset forms the third input element of the main gearset (HS) and is connected with the output element (430) of the fourth shift element (D) and the output element (530) of the fifth shift element (E);

the third sun gear (S3_HS) of the main gearset (HS) forms a fourth input element of the main gearset (HS) and is connected with the output element (330) of the third shift element (C) and the output element (630) of the sixth shift element (F); and the coupled ring gear (H13_HS) of the main gearset (HS) is fixed to the second carrier (ST2_HS) of the main gearset (HS) and form the output element of the main gearset (HS), and are coupled to the drive output shaft (AB).

28. The multi-stage automatic transmission according to claim 27, wherein the coupled carrier (ST13_HS) of the main gearset (HS) comprises a carrier plate, which extends radially inwardly and axially between the first sun gear (S1_HS) of the main gearset (HS) and the third sun gear (S3_HS) of the main gearset (HS), a hub of the carrier plate is connected, in a rotationally fixed manner, to one of the output element (530) of the fifth shift element (E) and a carrier shaft (540), which is connected, in a rotationally fixed manner, to the carrier plate, the output element (530) of the fifth shift element (E) passes axially centrally through one of the first sun gear (S1_HS) of the main gearset (HS), the second sun gear (S2_HS) of the main gearset (HS) and the third sun gear (S3_HS) of the main gearset (HS).

29. The multi-stage automatic transmission according to claim 1, wherein selective engagement of the first shift element (A), the second shift element (B), the third shift element (C), the fourth shift element (D), the fifth shift element (E), and the sixth shift element (F) implements at least eight forward gears, as the input rotational speed of the drive input shaft (AN) is transmitted to the drive output shaft (AB) such that to shift from a current gear to one of a next higher gear and a next lower gear, a single shift element, engaged for the current gear, is disengaged and another shift element, disengaged for the current gear, is engaged;

a first forward gear results from engagement of the first shift element (A) and the fourth shift element (D);

a second forward gear results from engagement of the first shift element (A) and the third shift element (C);

a third forward gear results from engagement of the first shift element (A) and the second shift element (B);

a fourth forward gear results from engagement of the first shift element (A) and the sixth shift element (F);

a fifth forward gear results from engagement of the first shift element (A) and the fifth shift element (E);

a sixth forward gear results from engagement of the fifth shift element (E) and the sixth shift element (F);

a seventh forward gear results from engagement of the second shift element (B) and the fifth shift element (E);

an eighth forward gear results from engagement of the third shift element (C) and the fifth shift element (E); and a reverse gear results from engagement of the fourth shift element (D) and one of the second shift element (B) and the sixth shift element (F).

* * * * *